United States Patent
Shehata et al.

(10) Patent No.: US 12,375,129 B2
(45) Date of Patent: Jul. 29, 2025

(54) SIGNALING FOR MULTIPLE TRANSMISSION RECEPTION POINT ACTIVATION AND DEACTIVATION

(71) Applicant: QUALCOMM Incorporated, San Diego, CA (US)

(72) Inventors: Mohamed Atef Abdelazim Shehata, Lannion (FR); Jelena Damnjanovic, Del Mar, CA (US); Changhwan Park, San Diego, CA (US); Tao Luo, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 441 days.

(21) Appl. No.: 17/819,579

(22) Filed: Aug. 12, 2022

(65) Prior Publication Data

US 2024/0056124 A1    Feb. 15, 2024

(51) Int. Cl.
*H04B 7/024* (2017.01)
*H04L 5/00* (2006.01)
*H04W 24/02* (2009.01)
*H04W 48/16* (2009.01)

(52) U.S. Cl.
CPC ........... *H04B 7/024* (2013.01); *H04L 5/0051* (2013.01); *H04W 24/02* (2013.01); *H04W 48/16* (2013.01)

(58) Field of Classification Search
CPC ...... H04B 7/024; H04L 5/0051; H04W 24/02; H04W 48/16
See application file for complete search history.

(56) References Cited

U.S. PATENT DOCUMENTS

| 2021/0050968 A1* | 2/2021 | Yi | H04L 5/0048 |
| 2021/0105780 A1* | 4/2021 | Jin | H04W 72/23 |
| 2021/0400626 A1* | 12/2021 | Yerramalli | H04L 5/0048 |
| 2022/0132517 A1 | 4/2022 | Zhu et al. | |

FOREIGN PATENT DOCUMENTS

| CN | 103581933 B | * | 4/2018 | ........... H04L 1/1812 |
| WO | WO-2022087115 A1 | * | 4/2022 | ........ H04W 36/0033 |

OTHER PUBLICATIONS

International Search Report and Written Opinion—PCT/US2023/070246—ISA/EPO—Oct. 26, 2023.

* cited by examiner

*Primary Examiner* — Saad A. Waqas
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may receive, from a first serving cell via Layer 3 control signaling, a configuration indicating a plurality of transmission reception points (TRPs) and one or more parameters enabling activation or deactivation of TRPs in the plurality of TRPs. The UE may receive, from the first serving cell via Layer 2 control signaling, explicit multi-TRP information that indicates an activation of a second serving cell and a TRP associated with the second serving cell, wherein the explicit multi-TRP information indicates that the second serving cell is to be activated as a primary cell and the TRP is to be activated as a primary TRP. The UE may communicate with the primary cell and the primary TRP. Numerous other aspects are described.

30 Claims, 19 Drawing Sheets

SIGNALING FOR MULTIPLE TRANSMISSION RECEPTION POINT ACTIVATION AND DEACTIVATION

FIELD OF THE DISCLOSURE

Aspects of the present disclosure generally relate to wireless communication and to techniques and apparatuses for signaling for multiple transmission reception point activation and deactivation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a first serving cell via Layer 3 control signaling, a configuration indicating a plurality of transmission reception points (TRPs) and one or more parameters enabling activation or deactivation of TRPs in the plurality of TRPs. The method may include receiving, from the first serving cell via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP. The method may include communicating with the primary cell and the primary TRP based at least in part on the explicit multi-TRP information and the one or more parameters.

Some aspects described herein relate to a method of wireless communication performed by a network node. The method may include transmitting, to a UE via Layer 3 control signaling, a configuration indicating a plurality of TRPs and one or more parameters enabling activation or deactivation of TRPs in the plurality of TRPs. The method may include transmitting, to the UE via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP.

Some aspects described herein relate to an apparatus for wireless communication performed by a UE. The apparatus may include a memory and one or more processors, coupled to the memory. The one or more processors may be configured to receive, from a first serving cell via Layer 3 control signaling, a configuration indicating a plurality of TRPs and one or more parameters enabling activation or deactivation of TRPs in the plurality of TRPs. The one or more processors may be configured to receive, from the first serving cell via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP. The one or more processors may be configured to communicate with the primary cell and the primary TRP based at least in part on the explicit multi-TRP information and the one or more parameters.

Some aspects described herein relate to an apparatus for wireless communication performed by a network node. The apparatus may include a memory and one or more processors, coupled to the memory. The one or more processors may be configured to transmit, to a UE via Layer 3 control signaling, a configuration indicating a plurality of TRPs and one or more parameters enabling activation or deactivation of TRPs in the plurality of TRPs. The one or more processors may be configured to transmit, to the UE via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP.

Some aspects described herein relate to a non-transitory computer-readable medium that stores a set of instructions for wireless communication by a UE. The set of instructions, when executed by one or more processors of the UE, may cause the UE to receive, from a first serving cell via Layer 3 control signaling, a configuration indicating a plurality of TRPs and one or more parameters enabling activation or deactivation of TRPs in the plurality of TRPs. The set of instructions, when executed by one or more processors of the UE, may cause the UE to receive, from the first serving cell via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP. The set of instructions, when executed by one or more processors of the UE, may cause the UE to communicate with the primary cell and the primary TRP based at least in part on the explicit multi-TRP information and the one or more parameters.

Some aspects described herein relate to a non-transitory computer-readable medium that stores a set of instructions for wireless communication by a network node. The set of instructions, when executed by one or more processors of the network node, may cause the network node to transmit, to a UE via Layer 3 control signaling, a configuration indicating a plurality of TRPs and one or more parameters enabling activation or deactivation of TRPs in the plurality of TRPs. The set of instructions, when executed by one or more processors of the network node, may cause the network node to transmit, to the UE via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP.

Some aspects described herein relate to an apparatus for wireless communication. The apparatus may include means for receiving, from a first serving cell via Layer 3 control signaling, a configuration indicating a plurality of TRPs and one or more parameters enabling activation or deactivation of TRPs in the plurality of TRPs. The apparatus may include means for receiving, from the first serving cell via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP. The apparatus may include means for communicating with the primary cell and the primary TRP based at least in part on the explicit multi-TRP information and the one or more parameters.

Some aspects described herein relate to an apparatus for wireless communication. The apparatus may include means for transmitting, to a UE via Layer 3 control signaling, a configuration indicating a plurality of TRPs and one or more parameters enabling activation or deactivation of TRPs in the plurality of TRPs. The apparatus may include means for transmitting, to the UE via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
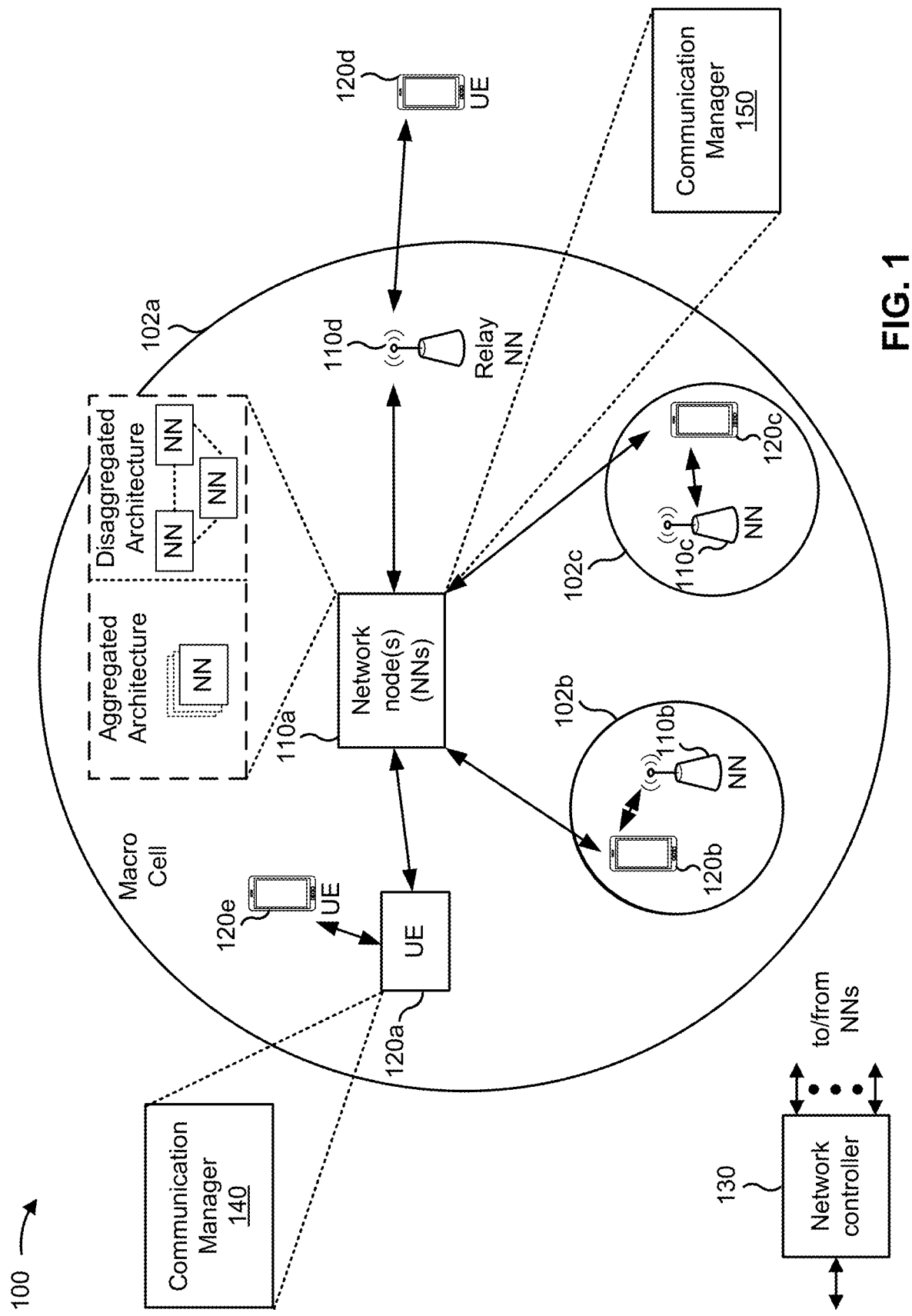
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a first serving cell via Layer 3 control signaling, a configuration indicating a plurality of TRPs and one or more parameters enabling activation or deactivation of TRPs in the plurality of TRPs; receive, from the first serving cell via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP; and communicate with the primary cell and the primary TRP based at least in part on the explicit multi-TRP information and the one or more parameters. Additionally, or alternatively, the communication manager 140 may perform one or more other operations described herein.

In some aspects, the network node 110 may include a communication manager 150. As described in more detail elsewhere herein, the communication manager 150 may transmit, to a UE via Layer 3 control signaling, a configuration indicating a plurality of TRPs and one or more parameters enabling activation or deactivation of TRPs in the plurality of TRPs; and transmit, to the UE via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP. Additionally, or alternatively, the communication manager 150 may perform one or more other operations described herein.

As indicated above, FIG. 1 is provided as an example. Other examples may differ from what is described with regard to FIG. 1.

Figure 2:
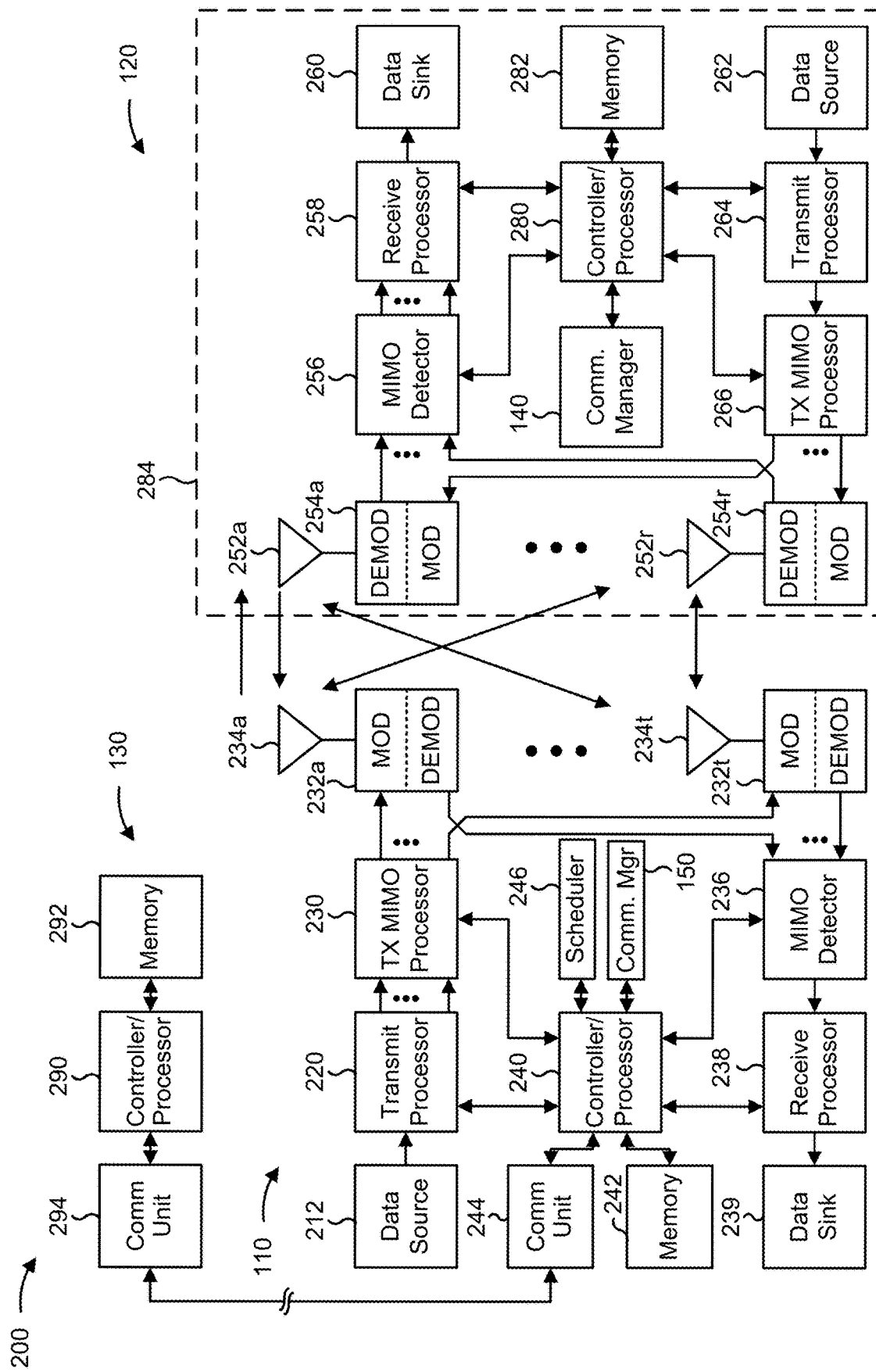
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate)

the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 9-16).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 9-16).

The controller/processor 240 of the network node 110, the controller/processor 280 of the UE 120, and/or any other component(s) of FIG. 2 may perform one or more techniques associated with signaling for multi-TRP activation and deactivation, as described in more detail elsewhere herein. For example, the controller/processor 240 of the network node 110, the controller/processor 280 of the UE 120, and/or any other component(s) of FIG. 2 may perform or direct operations of, for example, process 1300 of FIG. 13, process 1400 of FIG. 14, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1300 of FIG. 13, process 1400 of FIG. 14, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving, from a first serving cell via Layer 3 control signaling, a configuration indicating a plurality of TRPs and one or more parameters enabling activation or deactivation of TRPs in the plurality of TRPs (e.g., using antenna 252, modem 254, MIMO detector 256, receive processor 258, controller/processor 280, memory 282, or the like); means for receiving, from the first serving cell via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP (e.g., using antenna 252, modem 254, MIMO detector 256, receive processor 258, controller/processor 280, memory 282, or the like); and/or means for communicating with the primary cell and the primary TRP based at least in part on the explicit multi-TRP information and the one or more parameters (e.g., using antenna 252, modem 254, MIMO detector 256, receive processor 258, controller/processor 280, memory 282, controller/processor 280, transmit processor 264, TX MIMO processor 266, modem 254, or the like). The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting, to a UE via Layer 3 control signaling, a configuration indicating a plurality of TRPs and one or more parameters enabling activation or deactivation of TRPs in the plurality of TRPs (e.g., using controller/processor 240, transmit processor 220, TX MIMO processor 230, modem 232, antenna 234, memory 242, or the like); and/or means for transmitting, to the UE via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP (e.g., using controller/processor 240, transmit processor 220, TX MIMO processor 230, modem 232, antenna 234, memory 242, or the like). In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an JAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
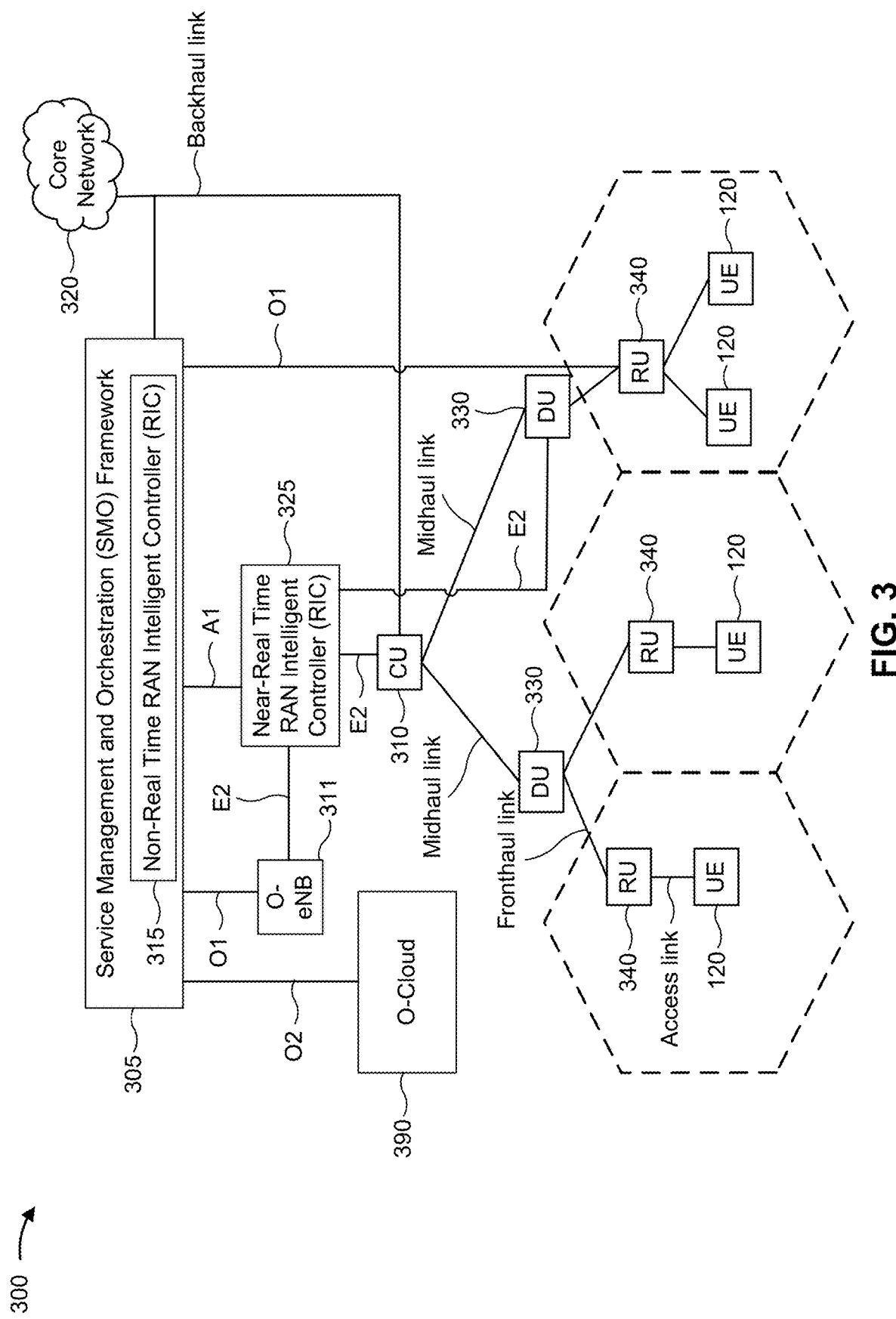
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
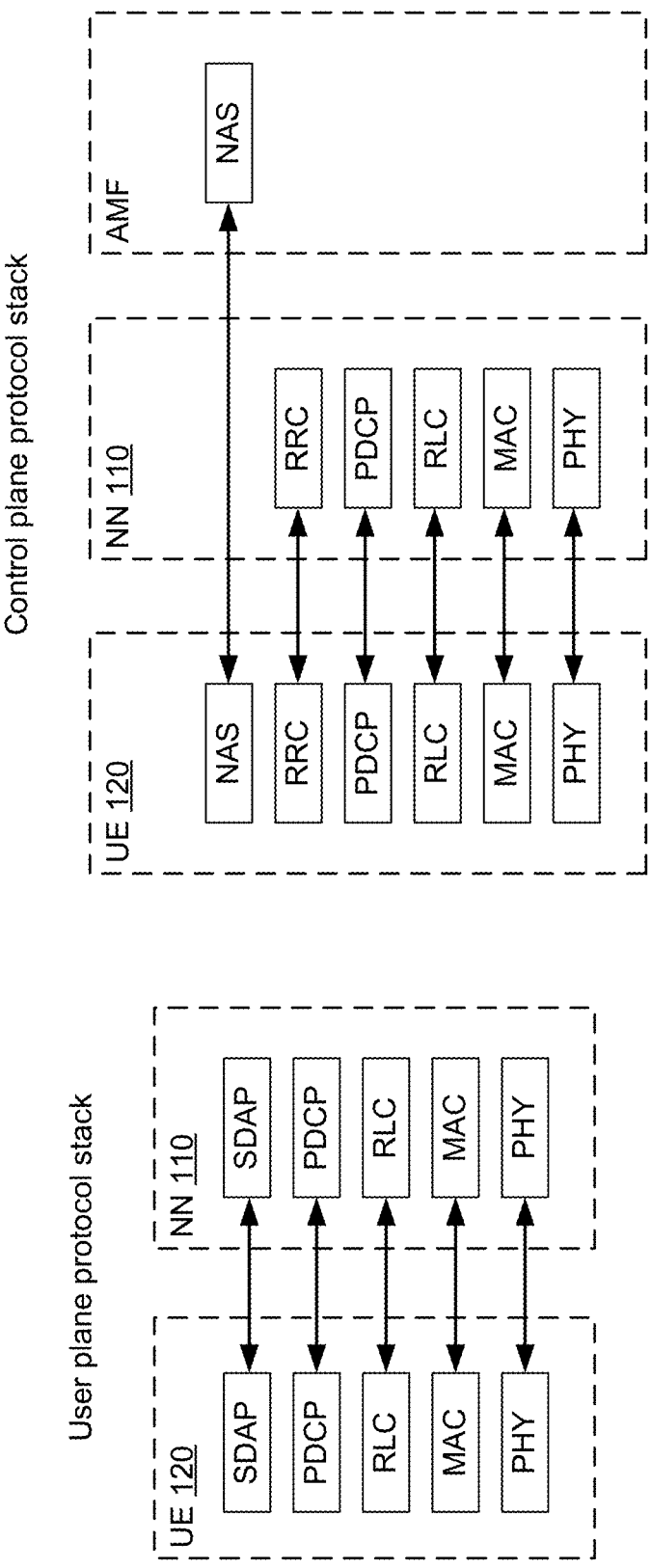
FIG. 4 is a diagram illustrating an example of a user plane protocol stack and a control plane protocol stack for a network node and a core network in communication with a UE, in accordance with the present disclosure.

FIG. 4 is a diagram illustrating an example 400 of a user plane protocol stack and a control plane protocol stack for a network node 110 and a core network in communication with a UE 120, in accordance with the present disclosure. In some aspects, the network node 110 may include a plurality of network nodes 110. In some aspects, protocol stack functions of the network node 110 may be distributed across multiple network nodes 110. For example, a first network node 110 may implement a first layer of a protocol stack and a second network node 110 may implement a second layer of the protocol stack. The distribution of the protocol stack across network nodes (in examples where the protocol stack is distributed across network nodes) may be based at least in part on a functional split, as described elsewhere herein. It should be understood that references to "a network node 110" or "the network node 110" can, in some aspects, refer to multiple network nodes.

On the user plane, the UE 120 and the network node 110 may include respective PHY layers, medium access control (MAC) layers, RLC layers, PDCP layers, and SDAP layers. A user plane function may handle transport of user data between the UE 120 and the network node 110. On the control plane, the UE 120 and the network node 110 may include respective RRC layers. Furthermore, the UE 120 may include a non-access stratum (NAS) layer in communication with an NAS layer of an access and management mobility function (AMF). The AMF may be associated with a core network associated with the network node 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 4, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation (CA), as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3).

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the network node 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARQ), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1).

On the receiving side (e.g., if the UE 120 is receiving a downlink communication or the network node 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

As indicated above, FIG. 4 is provided as an example. Other examples may differ from what is described with regard to FIG. 4.

Figure 5:
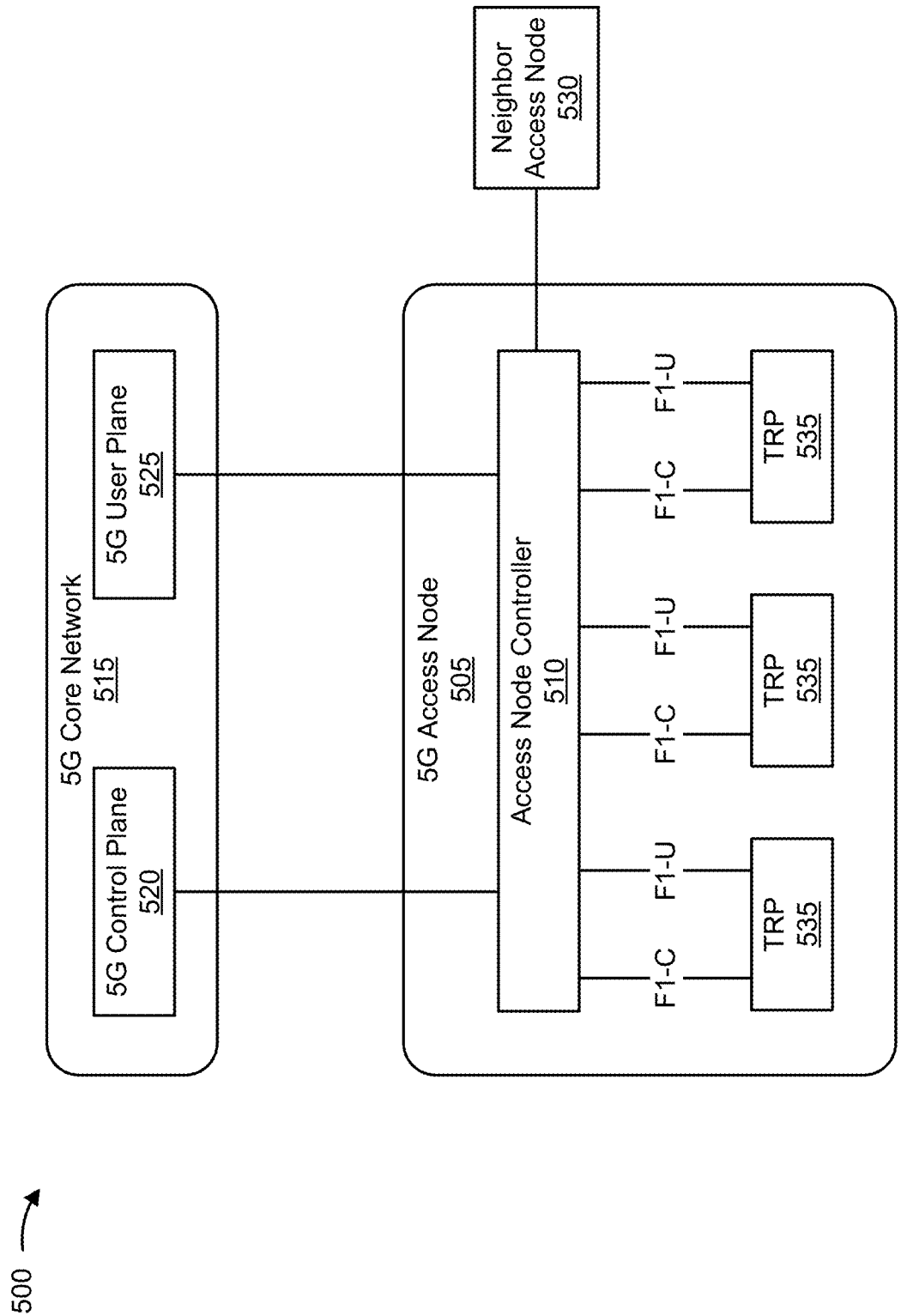
FIG. 5 illustrates an example logical architecture of a distributed radio access network, in accordance with the present disclosure.

FIG. 5 illustrates an example logical architecture of a distributed RAN 500, in accordance with the present disclosure.

A 5G access node 505 may include an access node controller 510. The access node controller 510 may be a CU of the distributed RAN 500. In some aspects, a backhaul interface to a 5G core network 515 may terminate at the access node controller 510. The 5G core network 515 may include a 5G control plane component 520 and a 5G user plane component 525 (e.g., a 5G gateway), and the backhaul interface for one or both of the 5G control plane and the 5G user plane may terminate at the access node controller 510. Additionally, or alternatively, a backhaul interface to one or more neighbor access nodes 530 (e.g., another 5G access node 505 and/or an LTE access node) may terminate at the access node controller 510.

The access node controller 510 may include and/or may communicate with one or more TRPs 535 (e.g., via an F1 Control (F1-C) interface and/or an F1 User (F1-U) interface). A TRP 535 may include a DU and/or an RU of the distributed RAN 500. In some aspects, a TRP 535 may correspond to a network node 110 described above in connection with FIG. 1. For example, different TRPs 535 may be included in different network nodes 110. Additionally, or alternatively, multiple TRPs 535 may be included in a single network node 110. In some aspects, a network node 110 may include a CU (e.g., access node controller 510) and/or one or more DUs (e.g., one or more TRPs 535). In some cases, a TRP 535 may be referred to as a cell, a panel, an antenna array, or an array.

A TRP 535 may be connected to a single access node controller 510 or to multiple access node controllers 510. In some aspects, a dynamic configuration of split logical functions may be present within the architecture of distributed RAN 500, referred to elsewhere herein as a functional split. For example, a PDCP layer, an RLC layer, and/or a MAC layer may be configured to terminate at the access node controller 510 or at a TRP 535.

In some aspects, multiple TRPs 535 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 535 may be configured to individually (e.g., using dynamic selection) or jointly (e.g., using joint transmission with one or more other TRPs 535) serve traffic to a UE 120.

As indicated above, FIG. 5 is provided as an example. Other examples may differ from what was described with regard to FIG. 5.

Figure 6:
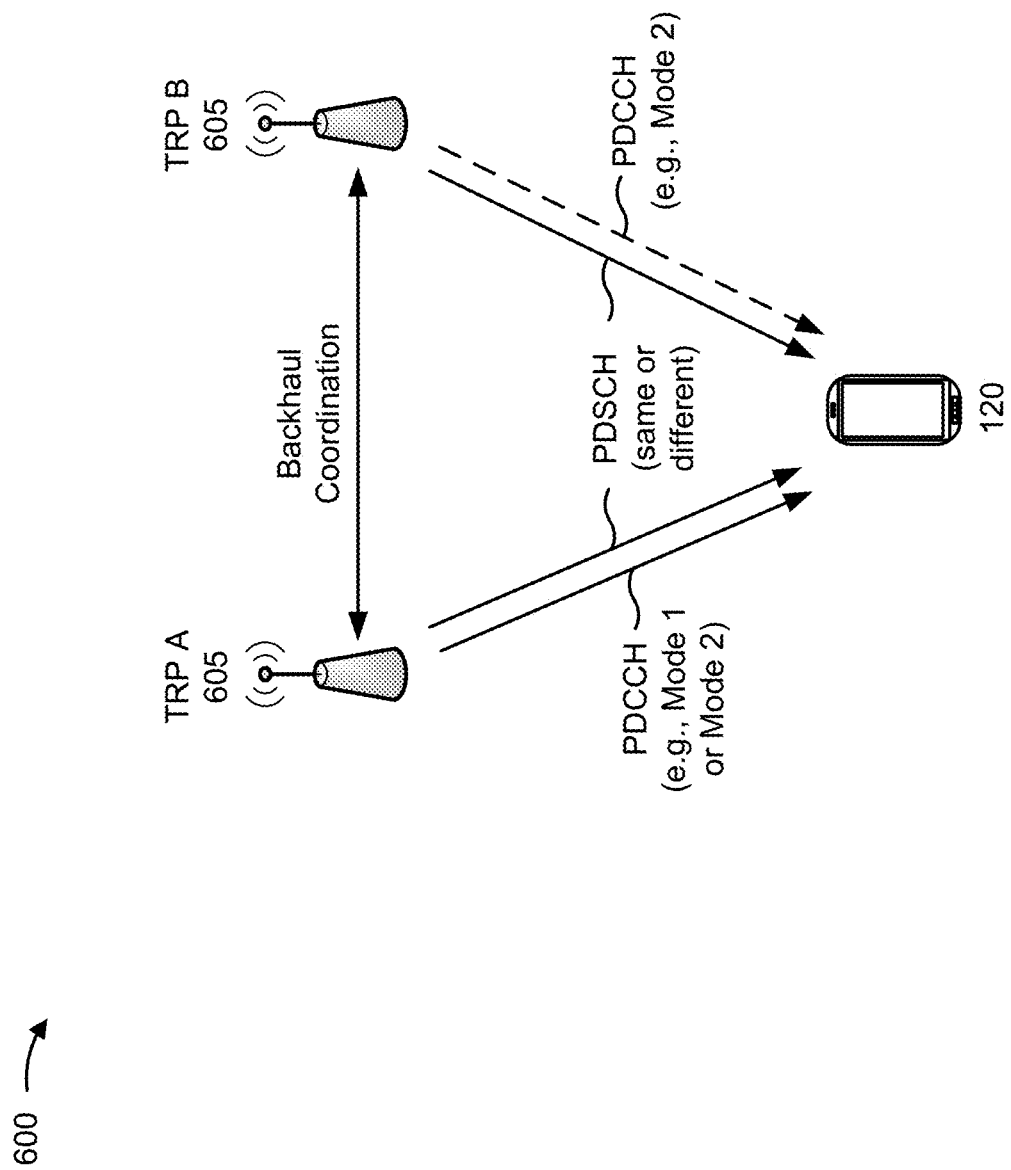
FIG. 6 is a diagram illustrating an example of multi-transmission reception point (TRP) communication, in accordance with the present disclosure.

FIG. 6 is a diagram illustrating an example 600 of multi-TRP communication (sometimes referred to as multi-panel communication), in accordance with the present disclosure. As shown in FIG. 6, multiple TRPs 605 may communicate with the same UE 120. A TRP 605 may correspond to a TRP 535 described above in connection with FIG. 5.

The multiple TRPs 605 (shown as TRP A and TRP B) may communicate with the same UE 120 in a coordinated manner (e.g., using coordinated multipoint transmissions) to improve reliability and/or increase throughput. The TRPs 605 may coordinate such communications via an interface between the TRPs 605 (e.g., a backhaul interface and/or an access node controller 510). The interface may have a smaller delay and/or higher capacity when the TRPs 605 are co-located at the same network node 110 (e.g., when the TRPs 605 are different antenna arrays or panels of the same network node 110), and may have a larger delay and/or lower capacity (as compared to co-location) when the TRPs 605 are located at different network nodes 110. The different TRPs 605 may communicate with the UE 120 using different QCL relationships (e.g., different TCI states), different DMRS ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 605 (e.g., TRP A and TRP B) may transmit communications to the UE 120 on the same PDSCH. For example, a communication may be transmitted using a single codeword with different spatial layers for different TRPs 605 (e.g., where one codeword maps to a first set of layers transmitted by a first TRP 605 and maps to a second set of layers transmitted by a second TRP 605). As another example, a communication may be transmitted using multiple codewords, where different codewords are transmitted by different TRPs 605 (e.g., using different sets of layers). In either case, different TRPs 605 may use different QCL relationships (e.g., different TCI states) for different DMRS ports corresponding to different layers. For example, a first TRP 605 may use a first QCL relationship or a first TCI state for a first set of DMRS ports corresponding to a first set of layers, and a second TRP 605 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1)

may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 605, and a second PDCCH may schedule a second codeword to be transmitted by a second TRP 605. Furthermore, first DCI (e.g., transmitted by the first TRP 605) may schedule a first PDSCH communication associated with a first set of DMRS ports with a first QCL relationship (e.g., indicated by a first TCI state) for the first TRP 605, and second DCI (e.g., transmitted by the second TRP 605) may schedule a second PDSCH communication associated with a second set of DMRS ports with a second QCL relationship (e.g., indicated by a second TCI state) for the second TRP 605. In this case, DCI (e.g., having DCI format 1_0 or DCI format 1_1) may indicate a corresponding TCI state for a TRP 605 corresponding to the DCI. The TCI field of a DCI indicates the corresponding TCI state (e.g., the TCI field of the first DCI indicates the first TCI state and the TCI field of the second DCI indicates the second TCI state).

In some cases, one or more serving cells may be aggregated to serve a UE, such as the UE 120. For example, the UE 120 may be served by a primary cell (PCell) and/or a secondary cell (SCell). The PCell may be configured to perform random access procedures, radio link monitoring, handover procedures, and/or physical uplink control channel (PUCCH) transmission, among other examples. The SCell may be a cell that is operating on a different frequency (e.g., a secondary frequency) and may be configured to provide additional radio services to the UE 120 once an RRC connection has been established. As described in more detail below, the UE 120 may be associated with a PCell and one or more SCells, and may be configured to switch between PCells and SCells as well as between TRPs associated with the PCells and SCells.

As indicated above, FIG. 6 is provided as an example. Other examples may differ from what is described with respect to FIG. 6.

Figure 7:
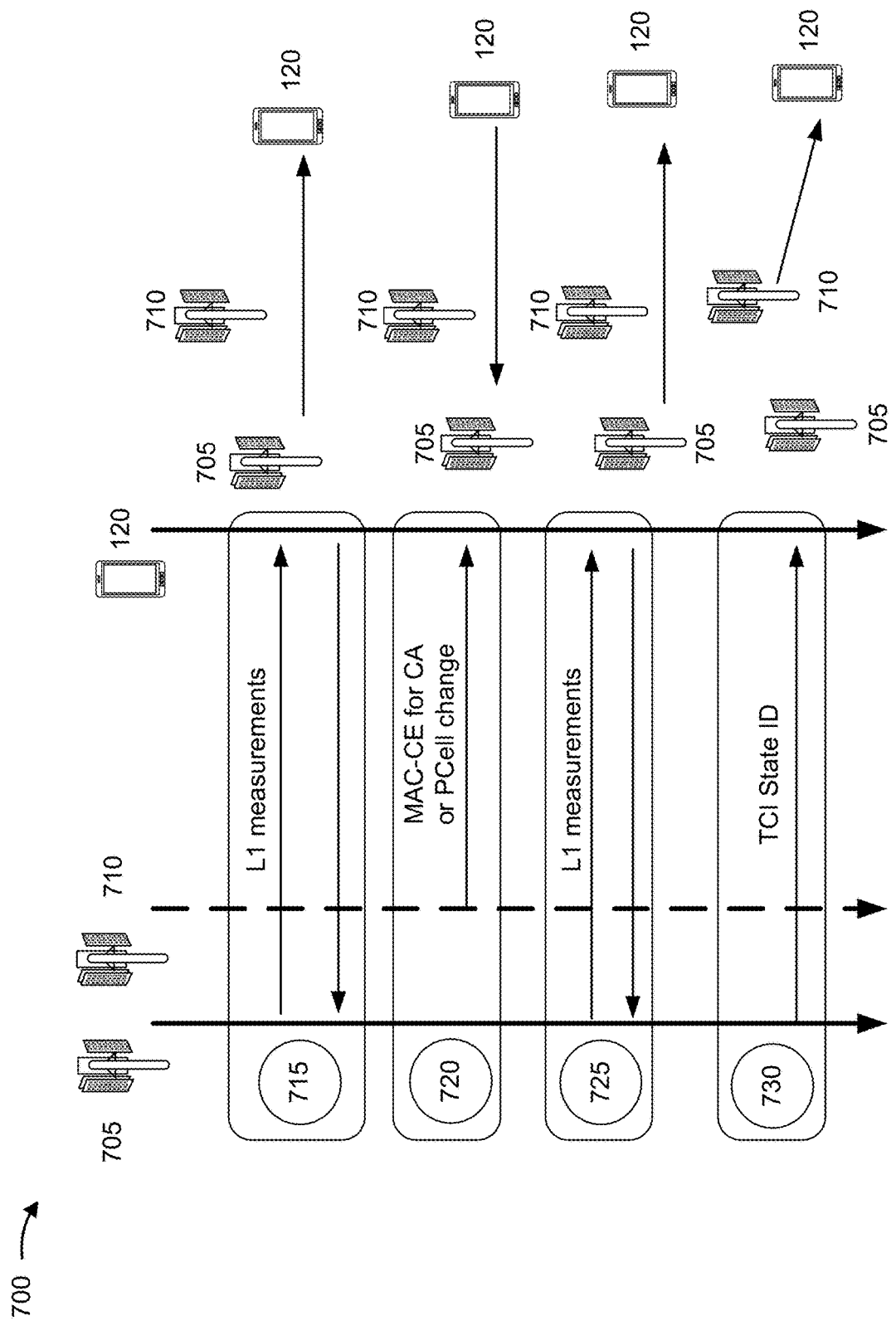
FIG. 7 is a diagram illustrating an example of transmission configuration indicator (TCI) state switching, in accordance with the present disclosure.

FIG. 7 is a diagram illustrating an example 700 of TCI state switching, in accordance with the present disclosure. A UE, such as the UE 120, may switch from communicating with a first TRP, such as the TRP 705, to communicating with a second TRP, such as the TRP 710. The TRP 705 and the TRP 710 may include some or all of the features of the TRP 535 and/or the TRP 605 described herein. As shown in connection with reference number 715, the TRP 705 and the UE 120 may communicate L1 measurements. The L1 measurements may include physical layer measurements. As shown by reference number 720, the TRP 710 may transmit, and the UE 120 may receive, a MAC control element (MAC-CE) for CA or for initiating a PCell change. As shown by reference number 725, the TRP 705 and the UE 120 may communicate additional L1 measurements based at least in part on the communication of the MAC-CE. As shown by reference number 730, the TRP 705 may transmit, and the UE 120 may receive, TCI information such as a TCI state identifier. The UE 120 and/or the network node 110 may be configured to deactivate the TRP 705, and activate the TRP 710, based at least in part on the communication of the TCI state identifier. The UE 120 may switch from communicating with the TRP 705 to communicating with the TRP 710 based at least in part on deactivating the TRP 705 and activating the TRP 710. Switching between communicating with the TRP 705 and the TRP 710 as shown by the example 700 may introduce latency, for example, due to the separate communications of the L1 measurements, the MAC-CE, and the TCI state identifier. Additional details regarding these features are described below.

As indicated above, FIG. 7 is provided as an example. Other examples may differ from what is described with respect to FIG. 7.

Figure 8A:
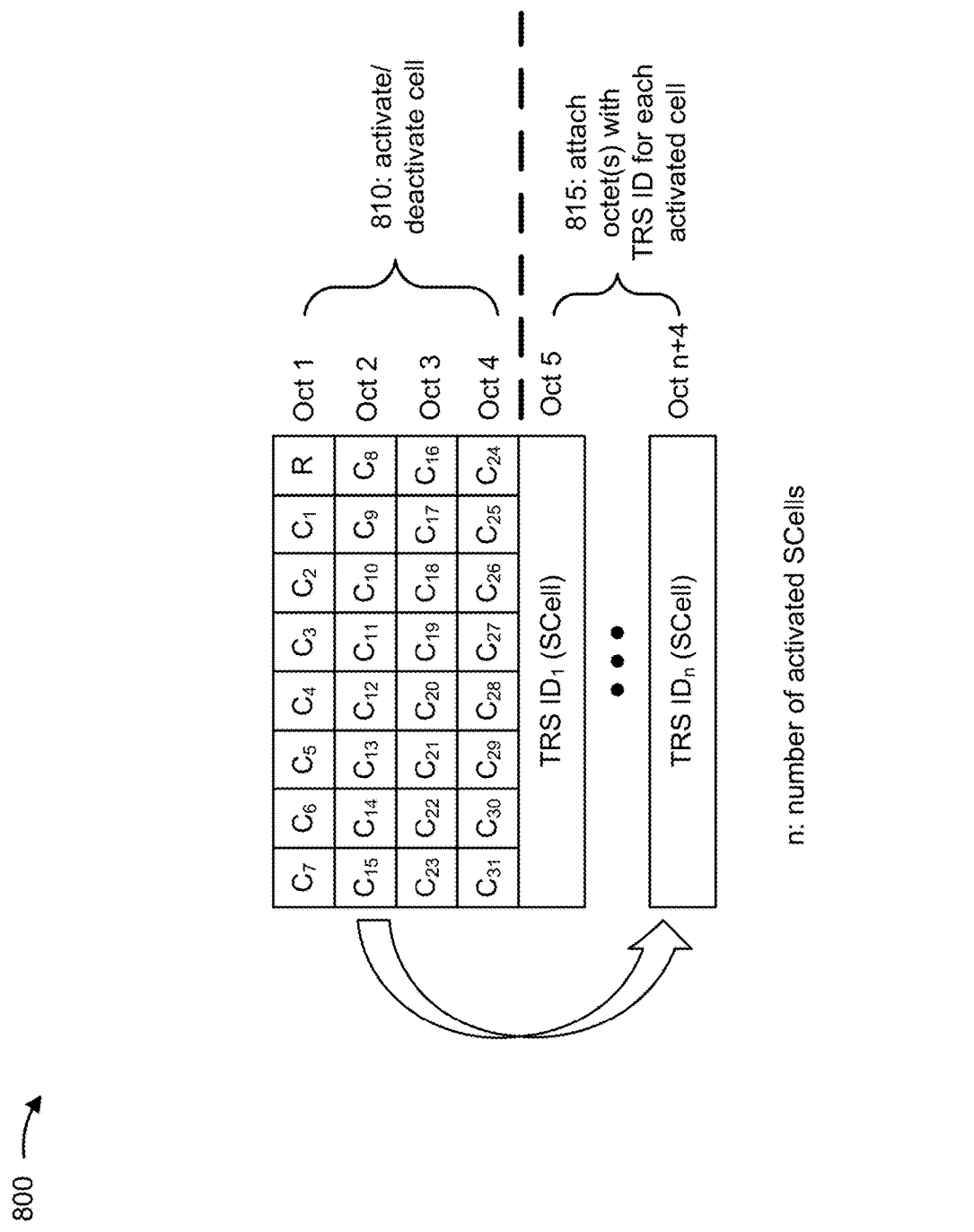
FIGS. 8A-8B are diagrams illustrating examples of medium access control communication for inter-frequency switching, in accordance with the present disclosure.
Figure 8B:
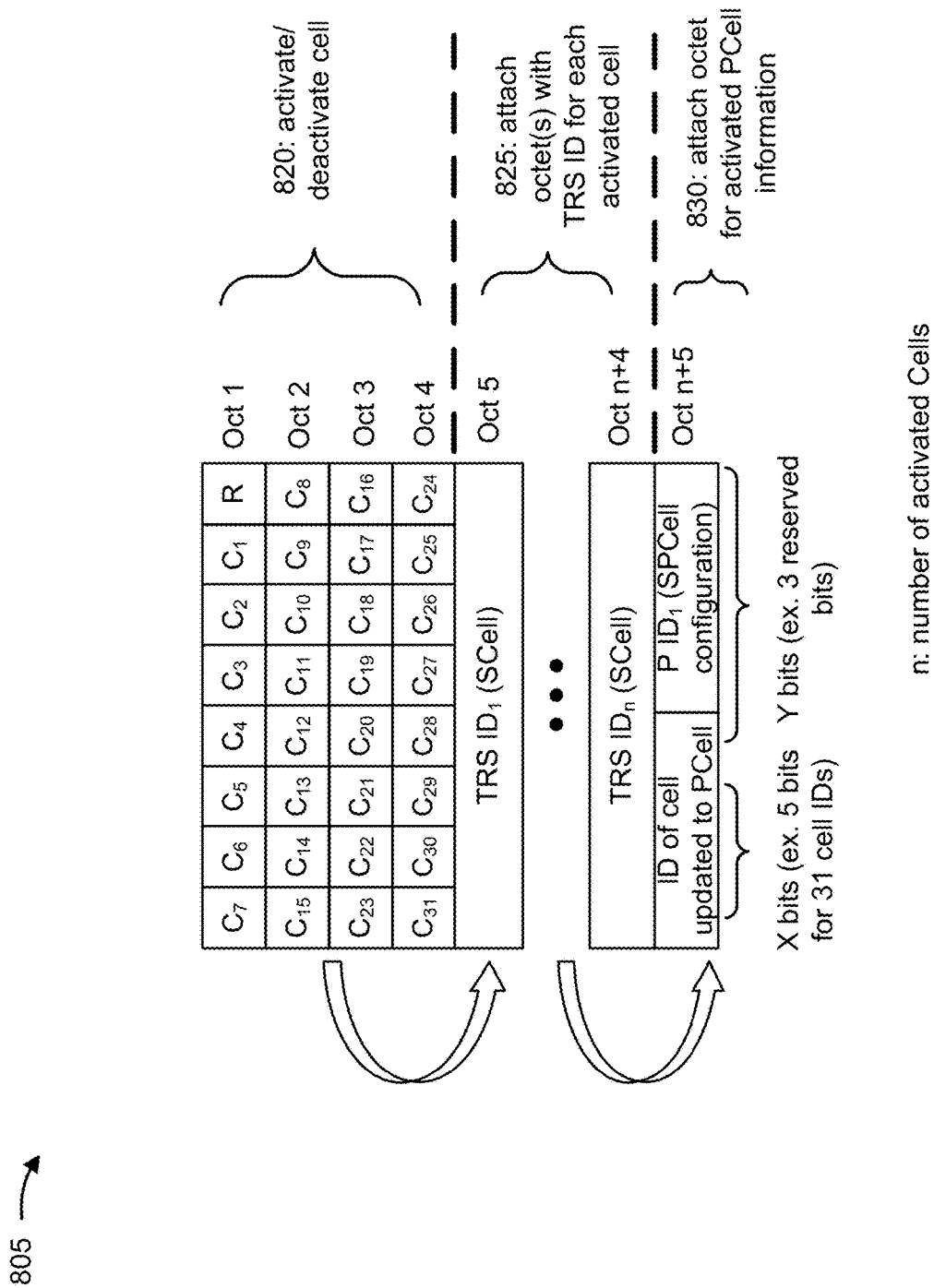

FIGS. 8A-8B are diagrams illustrating examples 800 and 805 of MAC-CE communication for inter-frequency switching, in accordance with the present disclosure.

As shown in FIG. 8A, and by reference number 810, one or more cells may be activated or deactivated. For example, a network node (such as the network node 110) may transmit, and a UE (such as the UE 120) may receive, a first MAC-CE that indicates to activate or deactivate the one or more cells (e.g., one or more SCells). In some cases, the first MAC-CE may include a bitmap that indicates a plurality of cells. For example, the bitmap may include a number of bits, where each bit of the bitmap corresponds to a respective cell of the plurality of cells. A first value of a bit (e.g., "1") of the bitmap may indicate that the corresponding cell is activated and a second value of the bit (e.g., "0") may indicate that the corresponding cell is deactivated. In one example, the bitmap may include 31 bits that respectively correspond to 31 SCells. The 31 bits may be included in four octets of the MAC-CE. As shown by reference number 815, the first MAC-CE may include one or more tracking reference signal (TRS) identifiers. For example, the first MAC-CE may include a number (n) of TRS identifiers that corresponds to the number of activated cells (e.g., a number activated SCells indicated by the bitmap). Each TRS identifier of the one or more TRS identifiers may be associated with an octet. For example, the first MAC-CE may include n octets that respectively correspond to n TRS identifiers, where the n TRS identifiers corresponds to the number of activated cells. In some cases, the TRS identifier may be associated with an RRC configuration information element (IE).

As shown in FIG. 8B, and by reference number 820, one or more cells may be activated or deactivated. For example, the network node 110 may transmit, and the UE 120 may receive, a second MAC-CE that indicates to activate or deactivate one or more cells (e.g., one or more PCells and/or one or more SCells). In some cases, the second MAC-CE may include a bitmap that includes a plurality of bits that respectively correspond to the number of cells. A first value of a bit (e.g., "1") may indicate that the corresponding cell is activated and a second value of the bit (e.g., "0") may indicate that the corresponding cell is deactivated. In one example, the bitmap may include 31 bits that respectively correspond to 31 cells. The 31 bits may be represented by four octets. As shown by reference number 825, the second MAC-CE may include one or more TRS identifiers. For example, the second MAC-CE may include a number (n) of TRS identifiers that corresponds to the number of activated cells. Each TRS identifier of the one or more TRS identifiers may be associated with an octet. For example, the second MAC-CE may include n octets that respectively correspond to n TRS identifiers, where the n TRS identifiers corresponds to the number of activated cells. As shown by reference number 830, the second MAC-CE may include PCell information associated with the activated PCell. The PCell information may be included in a single bit of the second MAC-CE. In some cases, the PCell information may include one or more bits (e.g., X bits) that indicate an identifier of the activated PCell and may include one or more other bits (e.g., Y bits) that indicate an RRC configuration IE for the activated PCell.

In some cases, the first MAC-CE may be configured for activating or deactivating SCells, and the second MAC-CE may be configured for activating or deactivating PCells and SCells. For example, the first MAC-CE and the second MAC-CE may be used for inter-frequency switching. However, the first MAC-CE and the second MAC-CE may not be able to be used for intra-frequency switching, such switching between TRPs. For example, the first MAC-CE and the second MAC-CE may not include information that is necessary for activating and deactivating TRPs. In some cases, TRPs may be activated or deactivated based at least in part on information (e.g., implicit information) that is included in TCI state information. The TCI state information may be transmitted using higher layer signaling, such as RRC signaling. However, this may result in latency to the intra-frequency switching.

Techniques and apparatuses are described herein for signaling for multi-TRP activation and deactivation. A network node and a UE may communicate multi-TRP information. The multi-TRP information may be explicit multi-TRP information. For example, the multi-TRP information may not be included with TCI state information. In some aspects, the network node may transmit, and the UE may receive, a MAC-CE that includes the explicit multi-TRP information. The explicit multi-TRP information may include information for activating and deactivating TRPs. The network node and/or the UE may activate a TRP and a PCell associated with the TRP, and may deactivate another TRP and another PCell associated with the other TRP, based at least in part on the explicit multi-TRP information.

As described above, in some cases, TRPs may be activated or deactivated based at least in part on information (e.g., implicit information) that is included in TCI state information. The TCI state information may be transmitted using higher layer signaling, such as RRC signaling. However, this may result in latency to intra-frequency switching. Using the techniques and apparatuses described herein, the UE and the network node may communicate a MAC-CE that includes explicit multi-TRP information for activating and deactivating TRPs. The UE and/or the network node may activate a TRP and a PCell associated with the TRP, and may deactivate another TRP and another PCell associated with the other TRP, based at least in part on the explicit multi-TRP information. This may reduce the latency required for intra-frequency switching, such as switching between the TRP and the other TRP. Additional details are described herein.

As indicated above, FIGS. 8A-8B are provided as examples. Other examples may differ from what is described with respect to FIGS. 8A-8B.

Figure 9:
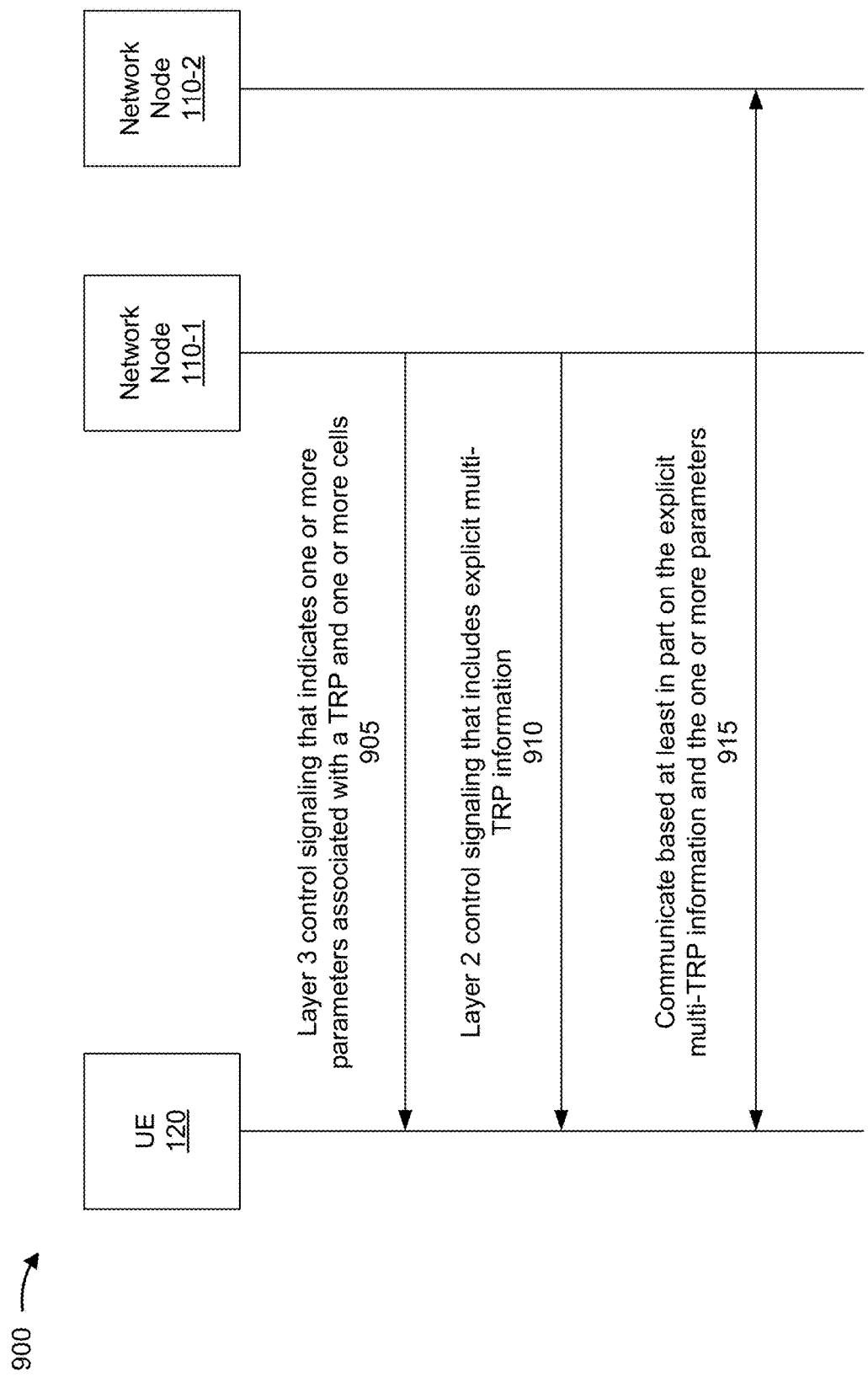
FIG. 9 is a diagram illustrating an example of signaling for multi-TRP activation and deactivation, in accordance with the present disclosure.

FIG. 9 is a diagram illustrating an example 900 of signaling for multi-TRP activation and deactivation, in accordance with the present disclosure. A UE, such as the UE 120, may communicate with one or more network nodes, such as the network node 110-1 and the network node 110-2. In some aspects, the network node 110-1 may be associated with a first serving cell for the UE 120, and the network node 110-2 may be associated with a second serving cell for the UE 120.

As shown by reference number 905, the network node 110 may transmit, and the UE 120 may receive, Layer 3 control signaling indicating a configuration that indicates a plurality of TRPs and one or more parameters enabling activation or deactivation of TRPs in the plurality of TRPs. For example, the one or more parameters may indicate information associated with the first serving cell (e.g., the current serving cell), information associated with a first TRP associated with the first serving cell, information associated with the second serving cell (e.g., the serving cell that is to be activated), and information associated with a second TRP associated with the second serving cell. In some aspects, the one or more parameters may include information for switching from the first serving cell to the second serving cell and/or information for switching from the first TRP to the second TRP.

As shown by reference number 910, the network node 110 may transmit, and the UE 120 may receive, Layer 2 control signaling that includes explicit multi-TRP information that indicates an activation of a second serving cell and a TRP, from among the plurality of TRPs, associated with the second serving cell. For example, the multi-TRP information may indicate that the second serving cell is to be activated as a primary cell and the TRP associated with the second serving cell is to be activated as a primary TRP. In some aspects, the multi-TRP information, that indicates the activation of the second serving cell and the TRP, from the plurality of TRPs, associated with the second serving cell, indicates to activate both (i) the second serving cell and (ii) the second TRP, from the plurality of TRPs, associated with the second serving cell. More generally, the Layer 2 control signaling including the explicit multi-TRP information may indicate an activation of the second serving cell and one or more TRPs, from the plurality of TRPs, associated with the second serving cell. In such a scenario, the primary TRP (or a non-primary TRP) may be selected from the one or more TRPs associated with the second serving cell. Additional details regarding these features are described below.

As shown by reference number 915, the UE 120 may communicate with the network node 110-2 (e.g., the second serving cell) and the second TRP based at least in part on the explicit multi-TRP information and the one or more parameters. In some aspects, the UE 120 may activate the second serving cell (e.g., the network node 110-2) and the second TRP associated with the second serving cell, and may deactivate the first serving cell (e.g., the network node 110-1) and the first TRP associated with the first serving cell, based at least in part on the explicit multi-TRP information and the one or more parameters. The UE 120 may communicate with the second serving cell and the second TRP based at least in part on activating the second serving cell and the second TRP and based at least in part on deactivating the first serving cell and the first TRP associated with the first serving cell.

In some aspects, the multi-TRP information may include cell identifier information, TRS identifier information, and PCell information. Additionally, the multi-TRP information may optionally include an SpCell configuration identifier. The cell identifier information may include a cell bitmap that includes a plurality of bits that respectively correspond to a plurality of cells. For example, each bit of the cell bitmap may correspond to a cell of the plurality of cells. A first state of the bit (e.g., "1") may indicate that the corresponding cell is activated and a second state of the bit (e.g., "0") may indicate that the corresponding cell is deactivated. In one example, the cell bitmap may include 31 bits (e.g., bits 1-31) that are included in four octets of the multi-TRP information. The TRS identifier information may include a TRS identifier for each activated cell, such as for each cell that is indicated by the cell bitmap as being an activated cell. Each TRS identifier of the one or more TRS identifiers may be associated with an octet. For example, if there are n activated cells, the multi-TRP information may include n octets, where each octet indicates a TRS identifier corresponding to a respective activated cell. The PCell information may include cell identifier information associated with the PCell and/or may include TRP index information associated with an activated TRP within the PCell. For example, the PCell information may include one or more bits that indicate the cell identifier information associated with the activated PCell and may include one or more other bits that indicate the TRP index information associated with the activated TRP. The PCell information may be included in a single octet of the multi-TRP information. The SpCell configuration identifier may only be included in the multi-TRP information based at least in part on the cell having previously been deactivated. For example, the SpCell configuration identifier may only be included in the multi-TRP information based at least in part on the cell not being an active SCell or an active PCell before the communication of the MAC-CE. The SpCell configuration identifier may be included in a single octet of the multi-TRP information. Additional details regarding these features are described in connection with FIG. 10A.

In some aspects, the multi-TRP information may include cell identifier information, TRS identifier information, a TRP bitmap, and PCell information. The multi-TRP information may include a TRP bitmap portion that indicates the set of TRPs, from among the plurality of TRPs, associated with the primary cell, where the set of TRPs may include the primary cell. Additionally, the multi-TRP information may optionally include an SpCell configuration identifier. The cell identifier information may include a cell bitmap that includes a plurality of bits that respectively correspond to a plurality of cells. For example, each bit of the cell bitmap may correspond to a cell of the plurality of cells. A first state of the bit (e.g., "1") may indicate that the corresponding cell is activated and a second state of the bit (e.g., "0") may indicate that the corresponding cell is deactivated. In one example, the cell bitmap may include 31 bits (e.g., bits 1-31) that are included in four octets of the multi-TRP information. The TRS identifier information may include a TRS identifier for each activated cell, such as for each cell that is indicated by the cell bitmap as being an activated cell. Each TRS identifier of the one or more TRS identifiers may be associated with an octet. For example, if there are n activated cells, the multi-TRP information may include n octets, where each octet indicates a TRS identifier corresponding to a respective activated cell. The TRP bitmap may indicate one or more TRPs (e.g., a set of TRPs) within the activated cell. The TRP bitmap may include a plurality of bits, where each bit respectively corresponds to a TRP within the activated cell. A first state of the bit (e.g., "1") may indicate that the corresponding TRP is activated, and a second state of the bit may indicate that the corresponding TRP is deactivated. The PCell information may include cell identifier information associated with the PCell and/or may include TRP index information associated with an activated TRP within the PCell. For example, the PCell information may include one or more bits that indicate the cell identifier information associated with the activated PCell and may include one or more other bits that indicate the TRP index information associated with the activated TRP. The PCell information may be included in a single octet of the multi-TRP information. The SpCell configuration identifier may only be included in the multi-TRP information based at least in part on the cell having previously been deactivated. For example, the SpCell configuration identifier may only be included in the multi-TRP information based at least in part on the cell not being an active SCell or an active PCell before the communication of the MAC-CE. The SpCell configuration identifier may be included in a single octet of the multi-TRP information. Additional details regarding these features are described in connection with FIG. 10B.

In some aspects, the multi-TRP information may include cell-TRP combination information, TRS identifier information, and PCell information. Additionally, the multi-TRP information may optionally include an SpCell configuration identifier. The cell-TRP combination information may include a cell-TRP bitmap that includes a plurality of bits that respectively correspond to a plurality of cell-TRP combinations. A first state of a bit (e.g., "1") of the cell-TRP bitmap may indicate that the corresponding cell-TRP combination is activated and a second state of the bit (e.g., "0") may indicate that the corresponding cell-TRP combination is deactivated. In one example, the cell-TRP bitmap may include 256 bits that are included in 32 octets of the multi-TRP information. The TRS identifier information may include a TRS identifier for each activated cell, such as for each cell that is indicated by the cell bitmap as being an activated cell. Each TRS identifier of the one or more TRS identifiers may be associated with an octet. For example, if there are n activated cells, the multi-TRP information may include n octets, where each octet indicates a TRS identifier corresponding to a respective activated cell. The TRP bitmap may indicate one or more TRPs within the activated cell. The TRP bitmap may include a plurality of bits, where each bit respectively corresponds to a TRP within the activated cell. A first state of the bit (e.g., "1") may indicate that the corresponding TRP is activated, and a second state of the bit may indicate that the corresponding TRP is deactivated. The PCell information may include cell identifier information associated with the PCell and/or may include TRP index information associated with an activated TRP within the PCell. For example, the PCell information may include one or more bits that indicate the cell identifier information associated with the activated PCell and may include one or more other bits that indicate the TRP index information associated with the activated TRP. The PCell information may be included in a single octet of the multi-TRP information. The SpCell configuration identifier may be included in the multi-TRP information based at least in part on the cell having previously been deactivated. For example, the SpCell configuration identifier may only be included in the multi-TRP information based at least in part on the cell not being an active SCell or an active PCell before the communication of the MAC-CE. The SpCell configuration identifier may be included in a single octet of the multi-TRP information. Additional details regarding these features are described in connection with FIG. 11A.

In some aspects, the multi-TRP information may include cell-TRP combination coding information, TRS identifier information, and PCell information. Additionally, the multi-TRP information may optionally include an SpCell configuration identifier. The cell-TRP combination coding information may include coding signaling that is based at least in part on the cell-TRP combination information (e.g., the cell-TRP combination bitmap) described above. In some aspects, the cell-TRP combination coding information may be represented by 40 bits that are included in five octets of the multi-TRP information. The TRS identifier information may include a TRS identifier for each activated cell, such as for each cell that is indicated by the cell bitmap as being an activated cell. Each TRS identifier of the one or more TRS identifiers may be associated with an octet. For example, if there are n activated cells, the multi-TRP information may include n octets, where each octet indicates a TRS identifier corresponding to a respective activated cell. The TRP bitmap may indicate one or more TRPs within the activated cell. The TRP bitmap may include a plurality of bits, where each bit respectively corresponds to a TRP within the activated cell. A first state of the bit (e.g., "1") may indicate that the corresponding TRP is activated, and a second state of the bit may indicate that the corresponding TRP is deactivated. The PCell information may include cell identifier information associated with the PCell and/or may include TRP index information associated with an activated TRP within the PCell. For example, the PCell information may include one or more bits that indicate the cell identifier information associated with the activated PCell and may include one or more other bits that indicate the TRP index information associated with the activated TRP. The PCell information may be included in a single octet of the multi-TRP information. The SpCell configuration identifier may only be included in the multi-TRP information based at least in part on the cell having previously been deactivated. For example, the SpCell configuration identifier may only be included in the multi-TRP information based at least in part on the cell not being an active SCell or an active PCell before the communication of the MAC-CE. The SpCell configuration identifier may be included in a single octet of the multi-TRP information. Additional details regarding these features are described in connection with FIG. 11B.

In some aspects, the multi-TRP information may include TRP bitmap information, column set information, row set information, TRS identifier information, and PCell information. Additionally, the multi-TRP information may optionally include an SpCell configuration identifier. Additionally, or alternatively, the multi-TRP information may optionally include TCI state information. The TRP bitmap may include a plurality of bits that respectively correspond to a plurality of TRPs. For example, each bit of the TRP bitmap may correspond to a TRP of the plurality of TRPs. A first state of the bit (e.g., "1") may indicate that the corresponding TRP is activated and a second state of the bit (e.g., "0") may indicate that the corresponding TRP is deactivated. In one example, the TRP bitmap may include eight bits (e.g., bits 0-7) that are included in a single octet of the multi-TRP information. The column set information may include an octet for each activated TRP (e.g., as indicated by the TRP bitmap) that carries a column set of active cell indices. The number of activated TRPs may be represented by m. The column set of active cell indices may be based at least in part on coding information described herein. The row set information may include half of an octet (½ octet) for each activated TRP (e.g., as indicated by the TRP bitmap) that carries a row set of active cell indices. The row set of active cell indices may be based at least in part on the coding information described herein. In one example, 12 bits (1.5 octets) may be needed to signal any a possible combination of any cell with a TRP index. The TRS identifier information may include a TRS identifier for each activated cell, such as for each cell that is indicated by the cell bitmap as being an activated cell. Each TRS identifier of the one or more TRS identifiers may be associated with an octet. For example, if there are n activated cells, the multi-TRP information may include n octets, where each octet indicates a TRS identifier corresponding to a respective activated cell. The TRP bitmap may indicate one or more TRPs within the activated cell. The TRP bitmap may include a plurality of bits, where each bit respectively corresponds to a TRP within the activated cell. A first state of the bit (e.g., "1") may indicate that the corresponding TRP is activated, and a second state of the bit may indicate that the corresponding TRP is deactivated. The PCell information may include cell identifier information associated with the PCell and/or may include TRP index information associated with an activated TRP within the PCell. For example, the PCell information may include one or more bits that indicate the cell identifier information associated with the activated PCell and may include one or more other bits that indicate the TRP index information associated with the activated TRP. The PCell information may be included in a single octet of the multi-TRP information. The SpCell configuration identifier may only be included in the multi-TRP information based at least in part on the cell having previously been deactivated. For example, the SpCell configuration identifier may only be included in the multi-TRP information based at least in part on the cell not being an active SCell or an active PCell before the communication of the MAC-CE. The SpCell configuration identifier may be included in a single octet of the multi-TRP information. The TCI state identifier may include TCI information associated with the activated PCell and may be included in a single octet of the multi-TRP information. The TCI state identifier may be optional (e.g., the multi-TRP information may not include the TCI state identifier). Additional details regarding these features are described in connection with FIG. 12.

As described above, in some cases, TRPs may be activated or deactivated based at least in part on information (e.g., implicit information) that is included in TCI state information. The TCI state information may be transmitted using higher layer signaling, such as RRC signaling. However, this may result in latency to intra-frequency switching. Using the techniques and apparatuses described herein, the UE and the network node may communicate a MAC-CE that includes explicit multi-TRP information for activating and deactivating TRPs. The UE and/or the network node may activate a TRP and a PCell associated with the TRP, and may deactivate another TRP and another PCell associated with the other TRP, based at least in part on the explicit multi-TRP information. The UE may communicate with the TRP based at least in part on the TRP being activated, and may no longer communicate with the other TRP based at least in part on the other TRP being de-activated. This may reduce the latency required for intra-frequency switching, such as switching between the TRP and the other TRP.

As indicated above, FIG. 9 is provided as an example. Other examples may differ from what is described with respect to FIG. 9.

Figure 10A:
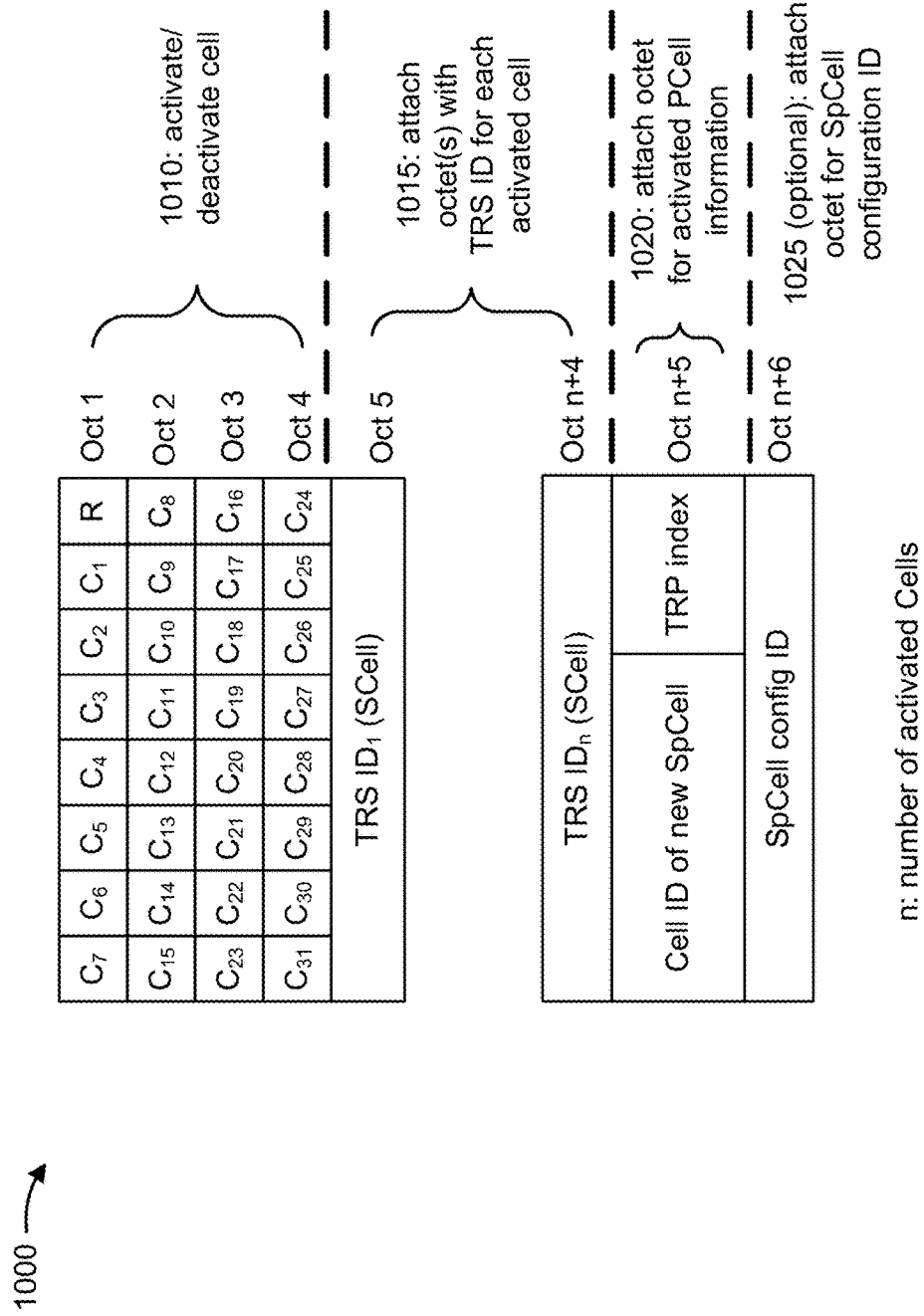
FIGS. 10A-10B are diagrams illustrating examples of multi-TRP information for TRP activation and deactivation, in accordance with the present disclosure.
Figure 10B:
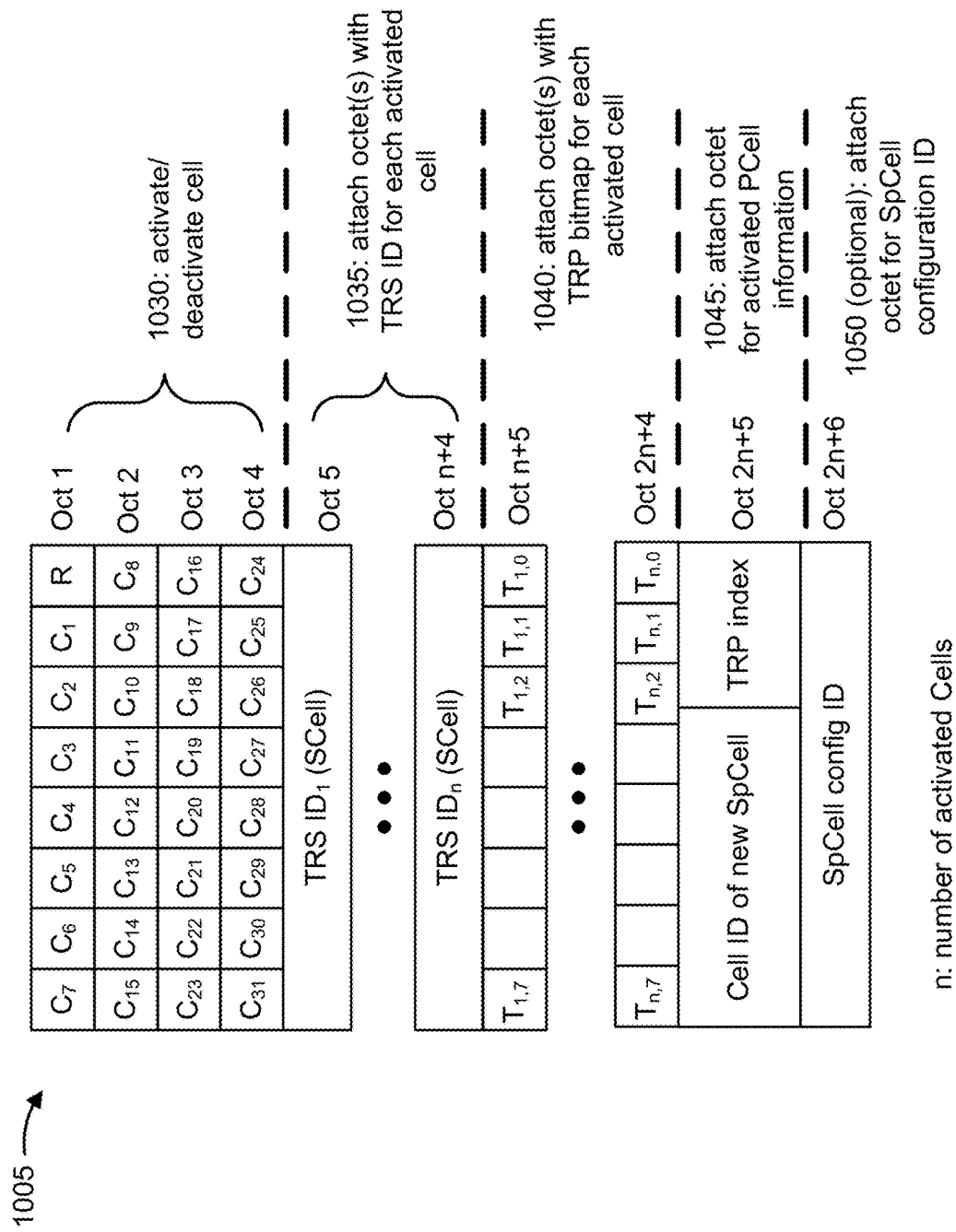

FIGS. 10A-10B are diagrams illustrating examples 1000 and 1005 of multi-TRP information for TRP activation and deactivation, in accordance with the present disclosure. A network node, such as the network node 110, may transmit the multi-TRP information to a UE, such as the UE 120. In some aspects, the network node 110 may transmit, and the UE 120 may receive, a MAC-CE that includes the multi-TRP information. The multi-TRP information may be explicit multi-TRP information. For example, the multi-TRP information may not be included as part of a TCI state identifier.

FIG. 10A shows a first option for multi-TRP information communication, as described herein. As shown by reference number 1010, one or more cells may be activated or deactivated. In some aspects, the multi-TRP information may include cell identifier information. The cell identifier information may include a cell bitmap that includes a plurality of bits that respectively correspond to a plurality of cells. For example, each bit of the cell bitmap may correspond to a cell of the plurality of cells. A first state of the bit (e.g., "1") may indicate that the corresponding cell is activated and a second state of the bit (e.g., "0") may indicate that the corresponding cell is deactivated. In some aspects, one or more cells may be associated with a cell identifier. In this case, a select bit of the cell bitmap may be associated with a select cell identifier and another select bit of the cell bitmap may be associated with another select cell identifier. In one example, the cell bitmap may include 31 bits (e.g., bits 1-31) that are included in four octets of the multi-TRP information. In some aspects, the cell identifier information (e.g., the cell bitmap that indicates the plurality of cells) may be included in a cell identifier portion of the multi-TRP information.

As shown by reference number 1015, the multi-TRP information may include one or more TRS identifiers. For example, the multi-TRP information may include a TRS identifier for each activated cell, such as for each cell that is indicated by the cell bitmap as being an activated cell. Each TRS identifier of the one or more TRS identifiers may be associated with an octet. For example, if the cell bitmap indicates that there are n activated cells, the multi-TRP information may include n octets, where each octet indicates a TRS identifier corresponding to a respective activated cell. In some aspects, the TRS identifier may be associated with an RRC configuration IE. The octet(s) associated with the TRS identifiers may enable the UE 120 to select from up to 256 RRC configurations of PCells or SCells. In some aspects, the TRS identifiers may be included in a TRS portion of the multi-TRP information.

As shown by reference number 1020, the multi-TRP information may include PCell information associated with the activated PCell. In some aspects, only one PCell may be activated for the UE 120 at a given time. The PCell information may be included in a single octet of the multi-TRP information. In some aspects, the PCell information may include cell identifier information associated with the PCell (or SpCell) and/or may include TRP index information associated with an activated TRP within the PCell. For example, the PCell information may include one or more bits that indicate the cell identifier information associated with the activated PCell and may include one or more other bits that indicate the TRP index information associated with the activated TRP. In some aspects, the PCell information may be included in a PCell information portion of the multi-TRP information.

As shown by reference number 1025, the multi-TRP information may include an SpCell configuration identifier. The SpCell configuration identifier may be included in a single octet of the multi-TRP information. In some aspects, the SpCell configuration identifier (e.g., the octet that includes the SpCell configuration identifier) may only be included in the multi-TRP information based at least in part on the cell having previously been deactivated. For example, the SpCell configuration identifier may only be included in the multi-TRP information based at least in part on the cell not being an active SCell or an active PCell before the communication of the MAC-CE. In some aspects, the octet(s) associated with SpCell configuration identifier may enable the UE 120 to select from up to 256 RRC configurations of the SpCell.

FIG. 10B shows a second option for multi-TRP information communication, as described herein. As shown by reference number 1030, one or more cells may be activated or deactivated. In some aspects, the multi-TRP information may include cell identifier information. The cell identifier information may include a cell bitmap that includes a plurality of bits that respectively correspond to a plurality of cells. For example, each bit of the cell bitmap may correspond to a cell of the plurality of cells. A first state of the bit (e.g., "1") may indicate that the corresponding cell is activated and a second state of the bit (e.g., "0") may indicate that the corresponding cell is deactivated. In some aspects, one or more cells may be associated with a cell identifier. In this case, a select bit of the cell bitmap may be associated with a select cell identifier and another select bit of the cell bitmap may be associated with another select cell identifier. In one example, the cell bitmap may include 31 bits (e.g., bits 1-31) that are included in four octets of the multi-TRP information. In some aspects, the cell identifier information (e.g., the cell bitmap that indicates the plurality of cells) may be included in a cell identifier portion of the multi-TRP information.

As shown by reference number 1035, the multi-TRP information may include one or more TRS identifiers. For example, the multi-TRP information may include a TRS identifier for each activated cell, such as for each cell that is indicated by the cell bitmap as being an activated cell. Each TRS identifier of the one or more TRS identifiers may be associated with an octet. For example, if the cell bitmap indicates that there are n activated cells, the multi-TRP information may include n octets, where each octet indicates a TRS identifier corresponding to a respective activated cell. In some aspects, the TRS identifier may be associated with an RRC configuration IE. The octet(s) associated with the TRS identifiers may enable the UE 120 to select from up to 256 RRC configurations of PCells or SCells. In some aspects, the TRS identifiers may be included in a TRS portion of the multi-TRP information.

As shown by reference number 1040, the multi-TRP information may include a TRP bitmap. For example, for each activated cell, the multi-TRP information may include a TRP bitmap that indicates the TRPs within the activated cell. The TRP bitmap may include a plurality of bits, where each bit respectively corresponds to a TRP within the activated cell. A first state of the bit (e.g., "1") may indicate that the corresponding TRP is activated, and a second state of the bit may indicate that the corresponding TRP is deactivated.

As shown by reference number 1045, the multi-TRP information may include PCell information associated with the activated PCell. In some aspects, only one PCell may be activated for the UE 120 at a given time. The PCell information may be included in a single octet of the multi-TRP information. In some aspects, the PCell information may include cell identifier information associated with the PCell and/or may include TRP index information associated with an activated TRP within the PCell. For example, the PCell information may include one or more bits that indicate the cell identifier information associated with the activated PCell and may include one or more other bits that indicate the TRP index information associated with the activated TRP. In some aspects, the PCell information may be included in a PCell information portion of the multi-TRP information.

As shown by reference number 1050, the multi-TRP information may include a SpCell configuration identifier. The SpCell configuration identifier may be included in a single octet of the multi-TRP information. In some aspects, the SpCell configuration identifier (e.g., the octet that includes the SpCell configuration identifier) may only be included in the multi-TRP information based at least in part on the cell having previously been deactivated. For example, the SpCell configuration identifier may only be included in the multi-TRP information based at least in part on the cell not being an active SCell or an active PCell before the communication of the MAC-CE. In some aspects, the octet (s) associated with SpCell configuration identifier may enable the UE 120 to select from up to 256 RRC configurations of the SpCell.

As indicated above, FIGS. 10A-10B are provided as examples. Other examples may differ from what is described with respect to FIGS. 10A-10B.

Figure 11A:
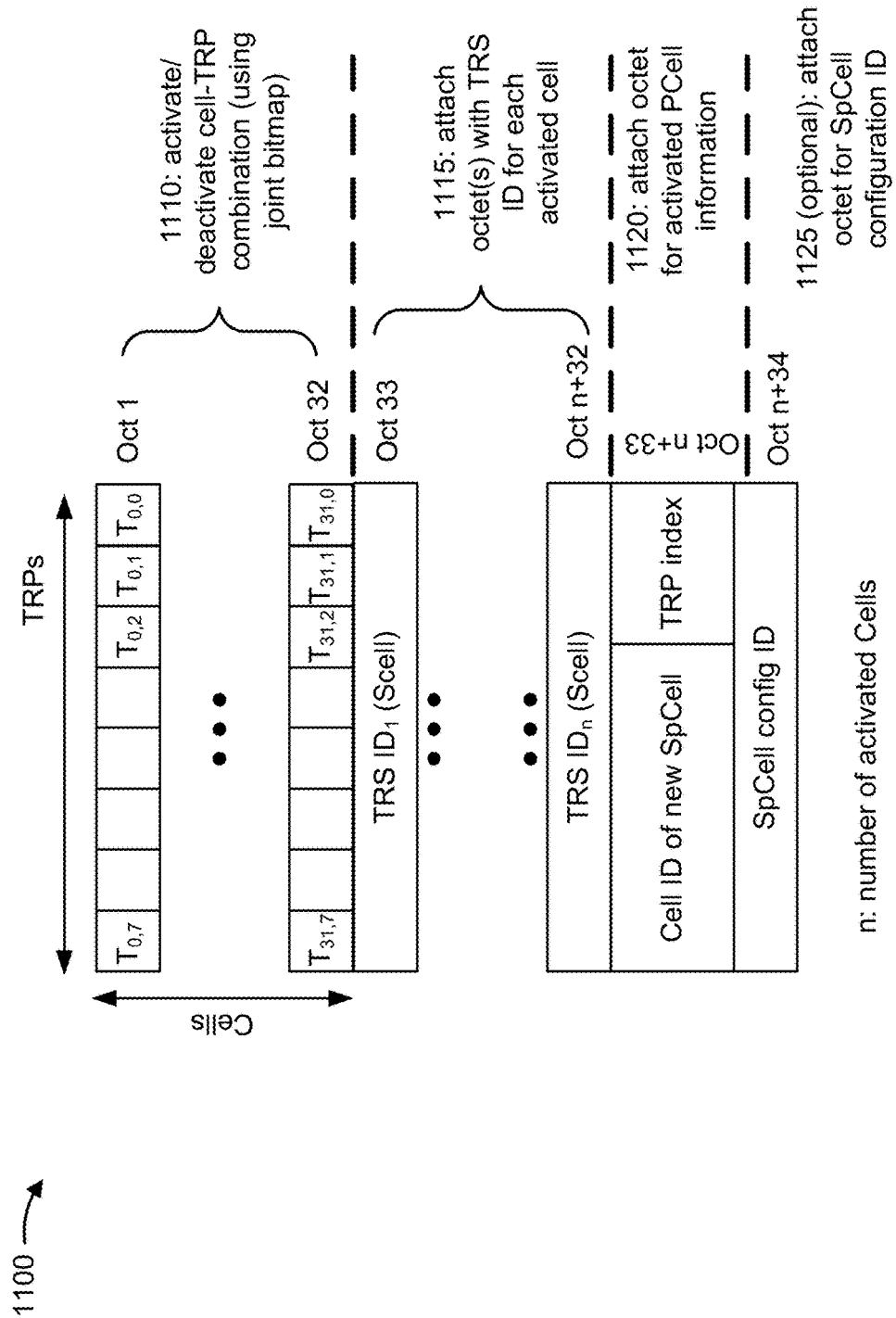
FIGS. 11A-11B are diagrams illustrating examples of multi-TRP information for TRP activation and deactivation, in accordance with the present disclosure.
Figure 11B:
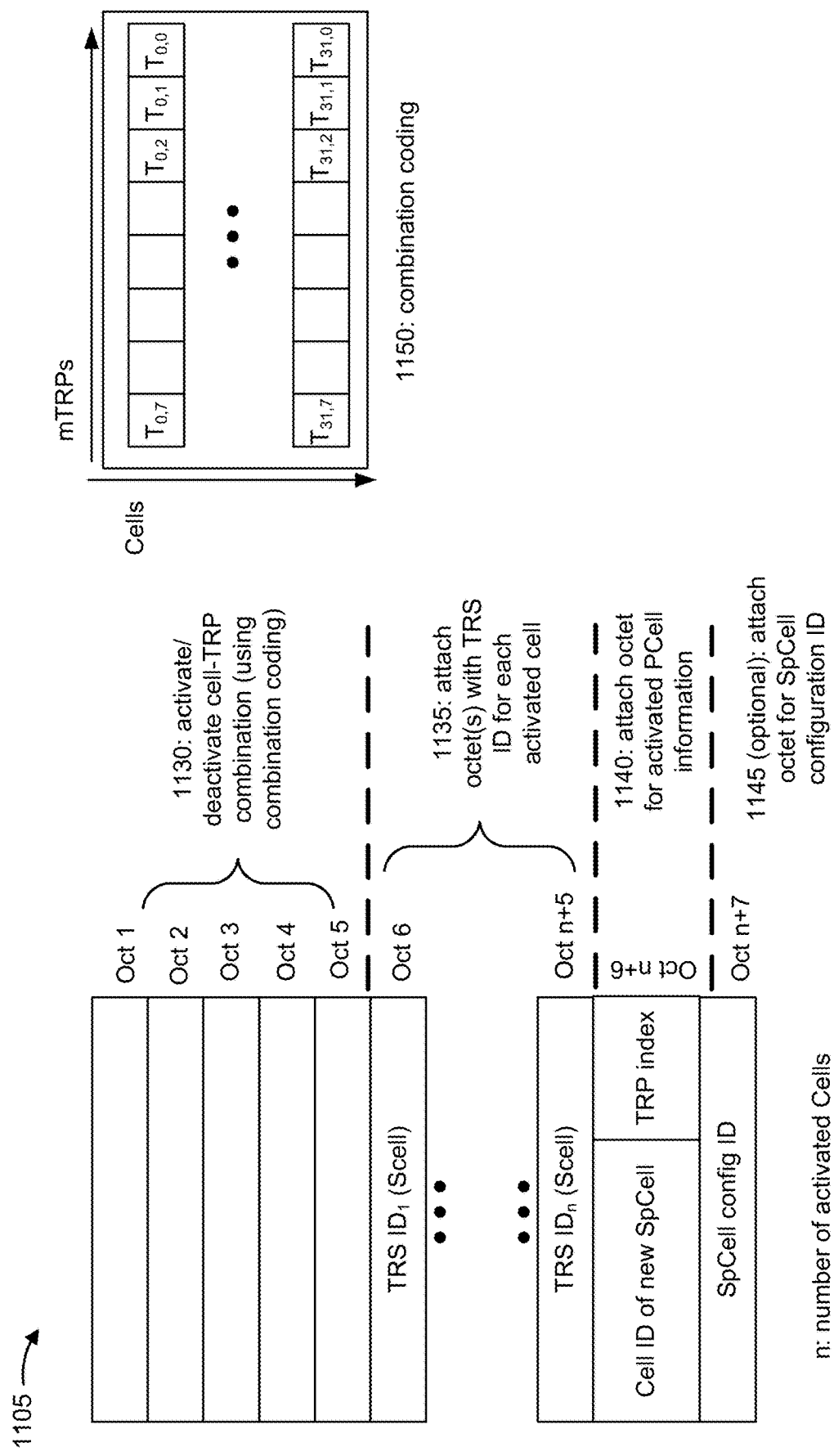

FIGS. 11A-11B are diagrams illustrating examples 1100 and 1105 of multi-TRP information for TRP activation and deactivation, in accordance with the present disclosure. A network node, such as the network node 110, may transmit the multi-TRP information to a UE, such as the UE 120. In some aspects, the network node 110 may transmit, and the UE 120 may receive, a MAC-CE that includes the multi-TRP information. The multi-TRP information may be explicit multi-TRP information. For example, the multi-TRP information may not be included as part of a TCI state identifier.

FIG. 11A shows a third option for multi-TRP information communication, as described herein. As shown by reference number 1110, one or more cells and one or more TRPs may be activated or deactivated. In some aspects, the multi-TRP information may include cell-TRP combination information. The cell-TRP combination information may include a cell-TRP bitmap that includes a plurality of bits that respectively correspond to a plurality of cell-TRP combinations. For example, a first bit may correspond to a first cell-TRP combination associated with a first cell and a first TRP, a second bit may correspond to a second cell-TRP combination associated with the first cell and a second TRP, a third bit may correspond to a cell-TRP combination associated with a second cell and the first TRP, and a fourth bit may correspond to a cell-TRP combination associated with the second cell and the second TRP, among other examples. A first state of the bit (e.g., "1") may indicate that the corresponding cell-TRP combination is activated and a second state of the bit (e.g., "0") may indicate that the corresponding cell-TRP combination is deactivated. In one example, the cell-TRP bitmap may include 256 bits that are included in 32 octets of the multi-TRP information.

As shown by reference number 1115, the multi-TRP information may include one or more TRS identifiers. For example, the multi-TRP information may include a TRS identifier for each activated cell, such as for each cell that is indicated by the cell bitmap as being an activated cell. Each TRS identifier of the one or more TRS identifiers may be associated with an octet. For example, if the cell bitmap indicates that there are n activated cells, the multi-TRP information may include n octets, where each octet indicates a TRS identifier corresponding to a respective activated cell. In some aspects, the TRS identifier may be associated with an RRC configuration IE. The octet(s) associated with the TRS identifiers may enable the UE 120 to select from up to 256 RRC configurations of PCells or SCells. In some aspects, the TRS identifiers may be included in a TRS portion of the multi-TRP information.

As shown by reference number 1120, the multi-TRP information may include PCell information associated with the activated PCell. In some aspects, only one PCell may be activated for the UE 120 at a given time. The PCell information may be included in a single octet of the multi-TRP information. In some aspects, the PCell information may include cell identifier information associated with the PCell and/or may include TRP index information associated with an activated TRP within the PCell. For example, the PCell information may include one or more bits that indicate the cell identifier information associated with the activated PCell and may include one or more other bits that indicate the TRP index information associated with the activated TRP. In some aspects, the PCell information may be included in a PCell information portion of the multi-TRP information.

As shown by reference number 1125, the multi-TRP information may include a SpCell configuration identifier. The SpCell configuration identifier may be included in a single octet of the multi-TRP information. In some aspects, the SpCell configuration identifier (e.g., the octet that includes the SpCell configuration identifier) may only be included in the multi-TRP information based at least in part on the cell having previously been deactivated. For example, the SpCell configuration identifier may only be included in the multi-TRP information based at least in part on the cell not being an active SCell or an active PCell before the communication of the MAC-CE. In some aspects, the octet (s) associated with SpCell configuration identifier may enable the UE 120 to select from up to 256 RRC configurations of the SpCell.

FIG. 11B shows a fourth option for multi-TRP information communication, as described herein. As shown by reference number 1130, one or more cells and one or more TRPs may be activated or deactivated. In some aspects, the multi-TRP information may include cell-TRP combination coding information. The cell-TRP combination coding information may include coding signaling that is based at least in part on the cell-TRP combination information (e.g., the cell-TRP combination bitmap) described above in connection with reference number 1110. In some aspects, the TRP information associated with the cell-TRP combination information may be coded based at least in part on the following:

$$\#bits_c = \lceil \log_2 \Sigma_{k=1}^{8} \binom{8}{k} \rceil = 8 \text{ bits},$$

where $\#bits_c$ is the number of bits for the columns representing the TRPs, and k is the number of TRPs.

In some aspects, the cell information associated with the cell-TRP combination information may be coded based at least in part on the following:

$$\#bits_r = \lceil \log_2 \Sigma_{k=1}^{32} \binom{32}{k} \rceil = 32 \text{ bits},$$

where $\#bits_r$ is the number of bits for the rows representing the cells, and k is the number of cells.

An example of the cell-TRP combination coding information is shown by reference number 1150. In some aspects, the cell-TRP combination coding information may be represented by 40 bits that are included in five octets of the multi-TRP information. Thus, the number of octets that are needed to indicate the cell-TRP combinations may be reduced.

As shown by reference number 1135, the multi-TRP information may include one or more TRS identifiers. For example, the multi-TRP information may include a TRS identifier for each activated cell, such as for each cell that is indicated by the cell bitmap as being an activated cell. Each TRS identifier of the one or more TRS identifiers may be associated with an octet. For example, if the cell bitmap indicates that there are n activated cells, the multi-TRP information may include n octets, where each octet indicates a TRS identifier corresponding to a respective activated cell. In some aspects, the TRS identifier may be associated with an RRC configuration IE. The octet(s) associated with the TRS identifiers may enable the UE 120 to select from up to 256 RRC configurations of PCells or SCells. In some aspects, the TRS identifiers may be included in a TRS portion of the multi-TRP information.

As shown by reference number 1140, the multi-TRP information may include PCell information associated with the activated PCell. In some aspects, only one PCell may be activated for the UE 120 at a given time. The PCell information may be included in a single octet of the multi-TRP information. In some aspects, the PCell information may include cell identifier information associated with the PCell and/or may include TRP index information associated with an activated TRP within the PCell. For example, the PCell information may include one or more bits that indicate the cell identifier information associated with the activated PCell and may include one or more other bits that indicate the TRP index information associated with the activated TRP. In some aspects, the PCell information may be included in a PCell information portion of the multi-TRP information.

As shown by reference number 1145, the multi-TRP information may include a SpCell configuration identifier. The SpCell configuration identifier may be included in a single octet of the multi-TRP information. In some aspects, the SpCell configuration identifier (e.g., the octet that includes the SpCell configuration identifier) may only be included in the multi-TRP information based at least in part on the cell having previously been deactivated. For example, the SpCell configuration identifier may only be included in the multi-TRP information based at least in part on the cell not being an active SCell or an active PCell before the communication of the MAC-CE. In some aspects, the octet(s) associated with SpCell configuration identifier may enable the UE 120 to select from up to 256 RRC configurations of the SpCell.

As indicated above, FIGS. 11A-11B are provided as examples. Other examples may differ from what is described with respect to FIGS. 11A-11B.

Figure 12:
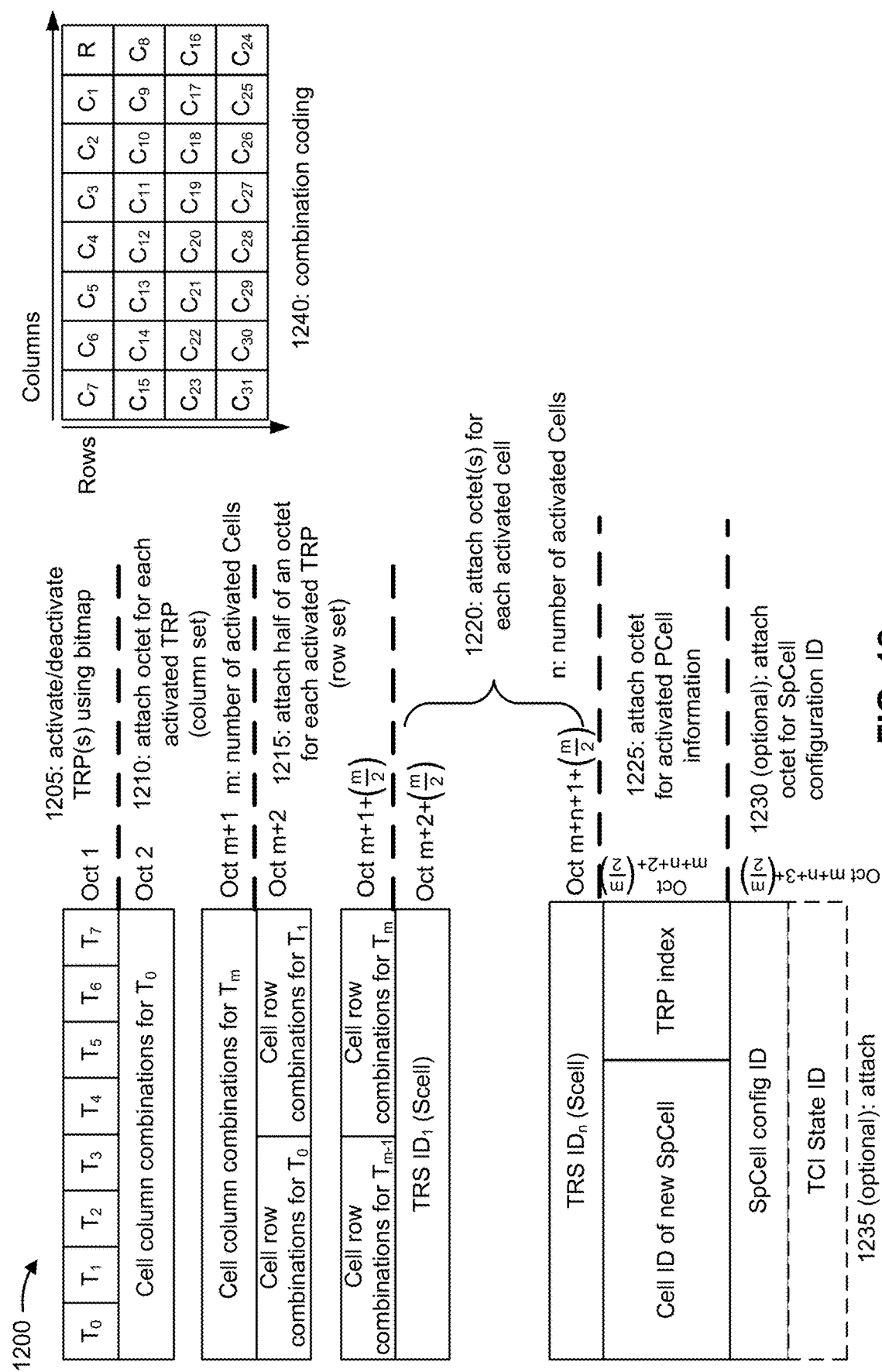
FIG. 12 is a diagram illustrating an example of multi-TRP information for TRP activation and deactivation, in accordance with the present disclosure.

FIG. 12 is a diagram illustrating an example 1200 of multi-TRP information for TRP activation and deactivation, in accordance with the present disclosure. A network node, such as the network node 110, may transmit the multi-TRP information to a UE, such as the UE 120. In some aspects, the network node 110 may transmit, and the UE 120 may receive, a MAC-CE that includes the multi-TRP information. The multi-TRP information may be explicit multi-TRP information. For example, the multi-TRP information may not be included as part of a TCI state identifier.

FIG. 12 shows a fifth option for multi-TRP information communication, as described herein. As shown by reference number 1205, one or more TRPs may be activated or deactivated. In some aspects, the multi-TRP information may include a TRP bitmap that includes a plurality of bits that respectively correspond to a plurality of TRPs. For example, each bit of the TRP bitmap may correspond to a TRP of the plurality of TRPs. A first state of the bit (e.g., "1") may indicate that the corresponding TRP is activated and a second state of the bit (e.g., "0") may indicate that the corresponding TRP is deactivated. In one example, the TRP bitmap may include eight bits (e.g., bits 0-7) that are included in a single octet of the multi-TRP information.

As shown by reference number 1210, the multi-TRP information may include column information. For example, for each activated TRP (e.g., as indicated by the TRP bitmap), the multi-TRP information may include an octet that carries a column set of active cell indices. The number of activated TRPs may be represented by m. In some aspects, the column set of active cell indices may be based at least in part on coding information. The coding information may be represented as follows:

$$\#bits_c = \left\lceil \log_2 \sum_{k=1}^{8} \binom{8}{k} \right\rceil = 8 \text{ bits,}$$

where $\#bits_c$ is the number of bits for the columns, and k is the number of TRPs.

As shown by reference number 1215, the multi-TRP information may include row information. For example, for each activated TRP (e.g., as indicated by the TRP bitmap), the multi-TRP information may include half of an octet (½ octet) that carries a row set of active cell indices. In some aspects, the row set of active cell indices may be based at least in part on coding information. The coding information may be represented as follows:

$$\#bits_r = \left\lceil \log_2 \sum_{k=1}^{4} \binom{4}{k} \right\rceil = 4 \text{ bits,}$$

where $\#bits_r$ is the number of bits for the rows, and k is the number of cells.

An example of the coding information is shown by reference number 1240. For example, 12 bits (1.5 octets) may be needed to signal any a possible combination of any cell with a TRP index.

As shown by reference number 1220, the multi-TRP information may include one or more TRS identifiers. For example, the multi-TRP information may include a TRS identifier for each activated cell, such as for each cell that is indicated by the cell bitmap as being an activated cell. Each TRS identifier of the one or more TRS identifiers may be associated with an octet. For example, if the cell bitmap indicates that there are n activated cells, the multi-TRP information may include n octets, where each octet indicates a TRS identifier corresponding to a respective activated cell. In some aspects, the TRS identifier may be associated with an RRC configuration IE. The octet(s) associated with the TRS identifiers may enable the UE 120 to select from up to 256 RRC configurations of PCells or SCells. In some aspects, the TRS identifiers may be included in a TRS portion of the multi-TRP information.

As shown by reference number 1225, the multi-TRP information may include PCell information associated with the activated PCell. In some aspects, only one PCell may be activated for the UE 120 at a given time. The PCell information may be included in a single octet of the multi-TRP information. In some aspects, the PCell information may include cell identifier information associated with the PCell and/or may include TRP index information associated with an activated TRP within the PCell. For example, the PCell information may include one or more bits that indicate the cell identifier information associated with the activated PCell and may include one or more other bits that indicate the TRP index information associated with the activated TRP. In some aspects, the PCell information may be included in a PCell information portion of the multi-TRP information.

As shown by reference number 1230, the multi-TRP information may include a SpCell configuration identifier. The SpCell configuration identifier may be included in a single octet of the multi-TRP information. In some aspects, the SpCell configuration identifier (e.g., the octet that includes the SpCell configuration identifier) may only be included in the multi-TRP information based at least in part on the cell having previously been deactivated. For example, the SpCell configuration identifier may only be included in the multi-TRP information based at least in part on the cell not being an active SCell or an active PCell before the communication of the MAC-CE. In some aspects, the octet(s) associated with SpCell configuration identifier may enable the UE 120 to select from up to 256 RRC configurations of the SpCell.

As shown by reference number 1235, the multi-TRP information may include a TCI state identifier. The TCI state identifier may be included in a single octet of the multi-TRP information. The TCI state identifier may include TCI information associated with the activated PCell. As shown in the figure, the TCI state identifier may be optional. Thus, in some aspects, the multi-TRP information may not include the TCI state identifier.

As indicated above, FIG. 12 is provided as an example. Other examples may differ from what is described with respect to FIG. 12.

Figure 13:
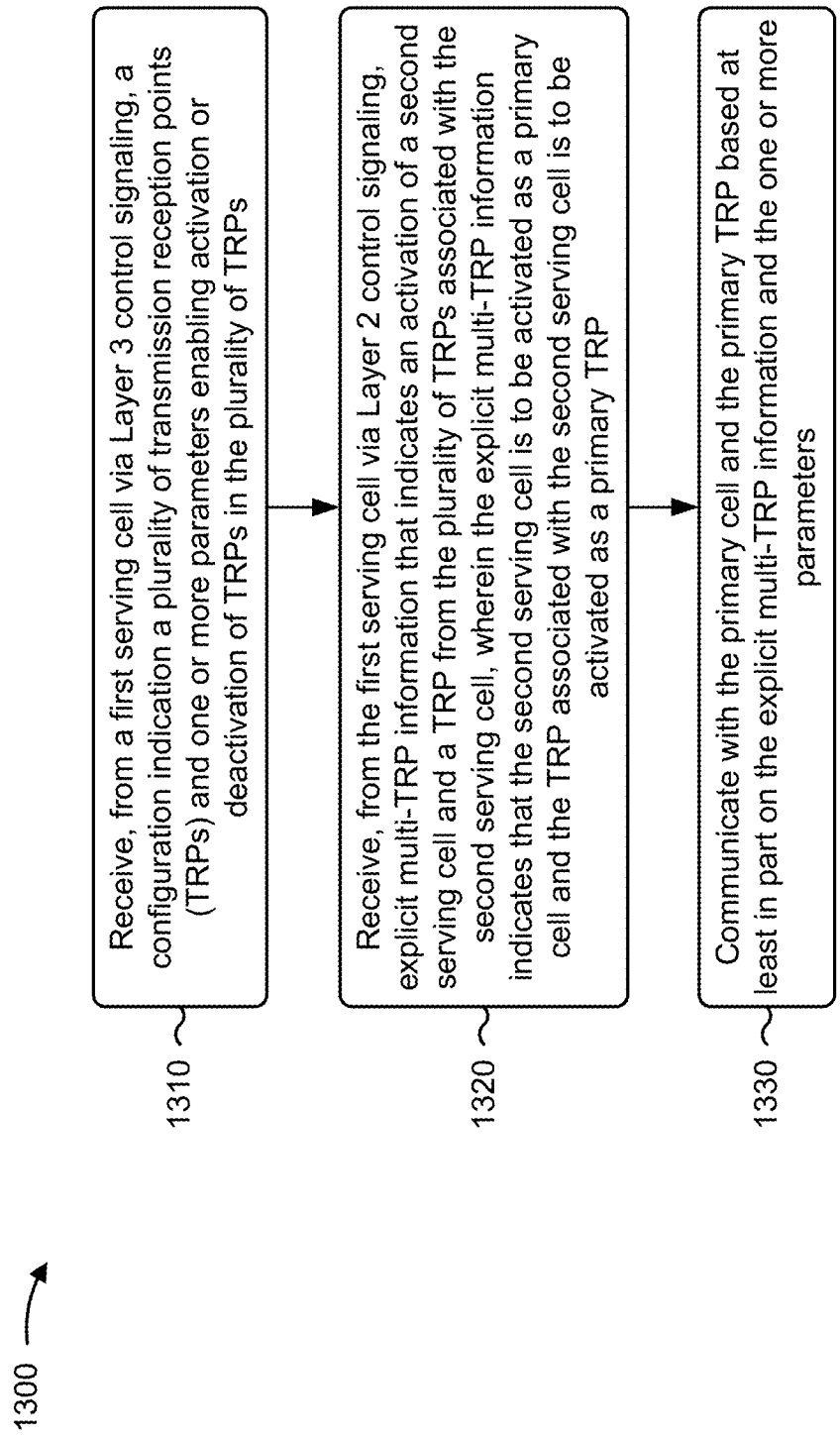
FIG. 13 is a diagram illustrating an example process performed, for example, by a UE, in accordance with the present disclosure.

FIG. 13 is a diagram illustrating an example process 1300 performed, for example, by a UE, in accordance with the present disclosure. Example process 1300 is an example where the UE (e.g., UE 120) performs operations associated with signaling for multiple TRP activation and deactivation.

As shown in FIG. 13, in some aspects, process 1300 may include receiving, from a first serving cell via Layer 3 control signaling, a configuration indicating a plurality of TRPs and one or more parameters enabling activation or deactivation of TRPs in the plurality of TRPs (block 1310). For example, the UE (e.g., using communication manager 140 and/or reception component 1502, depicted in FIG. 15) may receive, from a first serving cell via Layer 3 control signaling, a configuration indicating a plurality of TRPs and one or more parameters enabling activation or deactivation of TRPs in the plurality of TRPs, as described above, for example, with reference to FIGS. 9, 10A, 10B, 11A, 111B, and/or 12.

As further shown in FIG. 13, in some aspects, process 1300 may include receiving, from the first serving cell via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP (block 1320). For example, the UE (e.g., using communication manager 140 and/or reception component 1502, depicted in FIG. 15) may receive, from the first serving cell via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP, as described above, for example, with reference to FIGS. 9, 10A, 10B, 11A, 11B, and/or 12.

As further shown in FIG. 13, in some aspects, process 1300 may include communicating with the primary cell and the primary TRP based at least in part on the explicit multi-TRP information and the one or more parameters (block 1330). For example, the UE (e.g., using communication manager 140, reception component 1502, and/or transmission component 1504, depicted in FIG. 15) may communicate with the primary cell and the primary TRP based at least in part on the explicit multi-TRP information and the one or more parameters, as described above, for example, with reference to FIGS. 9, 10A, 10B, 11A, 11B, and/or 12.

Process 1300 may include additional aspects, such as any single aspect or any combination of aspects described below and/or in connection with one or more other processes described elsewhere herein.

In a first aspect, the explicit multi-TRP information includes a bitmap that identifies a plurality of cells.

In a second aspect, alone or in combination with the first aspect, the bitmap includes a plurality of bits that respectively correspond to the plurality of cells, wherein a first state of a bit of the plurality of bits indicates that a corresponding cell is activated and a second state of the bit indicates that the corresponding cell is deactivated.

In a third aspect, alone or in combination with one or more of the first and second aspects, the explicit multi-TRP information comprises a cell identifier portion that includes a plurality of cell identifiers, wherein one or more cell identifiers of the plurality of cell identifiers respectively indicate one or more activated cells, a TRS portion that includes one or more TRS identifiers, wherein each TRS identifier of the one or more TRS identifiers is associated with an activated cell of the one or more activated cells, and a primary cell information portion that includes information associated with the primary cell.

In a fourth aspect, alone or in combination with one or more of the first through third aspects, the explicit multi-TRP information further comprises a special cell configuration identifier based at least in part on a special cell associated with the special cell configuration identifier having been previously deactivated.

In a fifth aspect, alone or in combination with one or more of the first through fourth aspects, the cell identifier portion comprises a bitmap that includes a plurality of bits that respectively correspond to the plurality of cell identifiers, and the primary cell information portion includes one or more bits that indicate a cell identifier associated with the primary cell and one or more other bits that indicate a TRP index associated with the primary TRP.

In a sixth aspect, alone or in combination with one or more of the first through fifth aspects, the explicit multi-TRP information is associated with a plurality of octets, wherein the cell identifier portion is included in four octets of the plurality of octets, the TRS portion is included in a number of octets of the plurality of octets that corresponds to a number of cells associated with the one or more activated cells, and the primary cell information portion is included in a single octet.

In a seventh aspect, alone or in combination with one or more of the first through sixth aspects, the explicit multi-TRP information further comprises a TRP bitmap portion that indicates a set of TRPs, from the plurality of TRPs, associated with the primary cell, wherein the set of TRPs includes the primary TRP.

In an eighth aspect, alone or in combination with one or more of the first through seventh aspects, the TRP bitmap portion includes a plurality of TRP bits that respectively correspond to the plurality of TRPs, wherein a first state of a TRP bit of the plurality of TRP bits indicates that a corresponding TRP is activated and a second state of the TRP bit indicates that the corresponding TRP is deactivated.

In a ninth aspect, alone or in combination with one or more of the first through eighth aspects, the explicit multi-TRP information comprises a joint bitmap portion that includes joint bitmap information associated with a plurality of cell-TRP combinations, a TRS portion that includes one or more TRS identifiers, wherein each TRS identifier of the one or more TRS identifiers is associated with an activated cell of one or more activated cells, and a primary cell information portion that includes information associated with the primary cell.

In a tenth aspect, alone or in combination with one or more of the first through ninth aspects, the joint bitmap information includes a plurality of joint bitmap bits that respectively correspond to the plurality of cell-TRP combinations, wherein a first state of a joint bitmap bit of the plurality of joint bitmap bits indicates that a corresponding cell-TRP combination is activated, and a second state of the joint bitmap bit indicates that the corresponding cell-TRP combination is deactivated.

In an eleventh aspect, alone or in combination with one or more of the first through tenth aspects, the explicit multi-TRP information further comprises a special cell configuration identifier based at least in part on a special cell associated with the special cell configuration identifier having been previously deactivated.

In a twelfth aspect, alone or in combination with one or more of the first through eleventh aspects, the primary cell information portion includes one or more bits that indicate a cell identifier associated with the primary cell and one or more other bits that indicate a TRP index associated with the primary TRP.

In a thirteenth aspect, alone or in combination with one or more of the first through twelfth aspects, the explicit multi-TRP information is associated with a plurality of octets, wherein the joint bitmap portion is included in thirty-two octets of the plurality of octets, the TRS portion is included in a number of octets of the plurality of octets that corresponds to a number of cells associated with the one or more activated cells, and the primary cell information portion is included in a single octet.

In a fourteenth aspect, alone or in combination with one or more of the first through thirteenth aspects, the joint bitmap information includes coding information associated with the plurality of cell-TRP combinations.

In a fifteenth aspect, alone or in combination with one or more of the first through fourteenth aspects, the explicit multi-TRP information is associated with a plurality of octets, wherein the joint bitmap portion is included in five octets of the plurality of octets, the TRS portion is included in a number of octets of the plurality of octets that corresponds to a number of cells associated with the one or more activated cells, and the primary cell information portion is included in a single octet.

In a sixteenth aspect, alone or in combination with one or more of the first through fifteenth aspects, the explicit multi-TRP information comprises a TRP bitmap portion that includes a plurality of TRP bits that respectively correspond to the plurality of TRPs, wherein a first state of a TRP bit of the plurality of TRP bits indicates that a corresponding TRP is activated and a second state of the TRP bit indicates that the corresponding TRP is deactivated, a cell column portion that includes cell column combination information associated with one or more activated cells, a cell row portion that includes cell row combination information associated with the one or more activated cells, a TRS portion that includes one or more TRS identifiers, wherein each TRS identifier of the one or more TRS identifiers is associated with an activated cell of the one or more activated cells, and a primary cell information portion that includes information associated with the primary cell.

In a seventeenth aspect, alone or in combination with one or more of the first through sixteenth aspects, the explicit multi-TRP information further comprises coding information associated with the cell column combination information and the cell row combination information.

In an eighteenth aspect, alone or in combination with one or more of the first through seventeenth aspects, the explicit multi-TRP information further comprises a special cell configuration identifier based at least in part on a special cell associated with the special cell configuration identifier having been previously deactivated.

In a nineteenth aspect, alone or in combination with one or more of the first through eighteenth aspects, the primary cell information portion includes one or more bits that indicate a cell identifier associated with the primary cell and one or more other bits that indicate a TRP index associated with the primary TRP.

In a twentieth aspect, alone or in combination with one or more of the first through nineteenth aspects, the explicit multi-TRP information is associated with a plurality of octets, wherein the TRP bitmap portion is included in a single octet, the cell column portion is included in a number of octets of the plurality of octets that corresponds to a number of cells associated with the one or more activated cells, the cell row portion is included in a number of octets of the plurality of octets that corresponds to half of the number of cells associated with the one or more activated cells, the TRS portion is included in a number of octets of the plurality of octets that corresponds to the number of cells associated with the one or more activated cells, and the primary cell information portion is included in another single octet.

In a twenty-first aspect, alone or in combination with one or more of the first through twentieth aspects, the explicit multi-TRP information further comprises a transmission configuration indicator state identifier.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
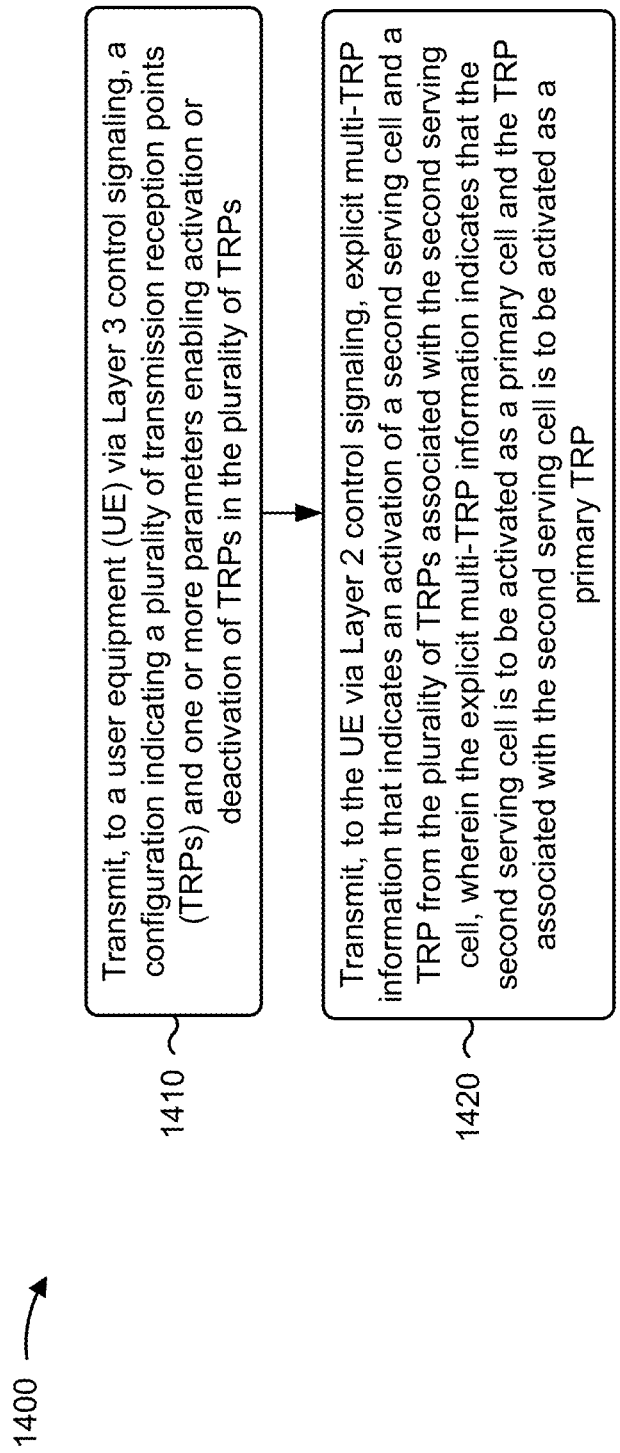
FIG. 14 is a diagram illustrating an example process performed, for example, by a network node, in accordance with the present disclosure.

FIG. 14 is a diagram illustrating an example process 1400 performed, for example, by a network node, in accordance with the present disclosure. Example process 1400 is an example where the network node (e.g., network node 110) performs operations associated with signaling for multiple TRP activation and deactivation.

As shown in FIG. 14, in some aspects, process 1400 may include transmitting, to a UE via Layer 3 control signaling, a configuration indicating a plurality of TRPs and one or more parameters enabling activation or deactivation of TRPs in the plurality of TRPs (block 1410). For example, the network node (e.g., using communication manager 150 and/or transmission component 1604, depicted in FIG. 16) may transmit, to a UE via Layer 3 control signaling, a configuration indicating a plurality of TRPs and one or more parameters enabling activation or deactivation of TRPs in the plurality of TRPs, as described above, for example, with reference to FIGS. 9, 10A, 10B, 11A, 11B, and/or 12.

As further shown in FIG. 14, in some aspects, process 1400 may include transmitting, to the UE via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP (block 1420). For example, the network node (e.g., using communication manager 150 and/or transmission component 1604, depicted in FIG. 16) may transmit, to the UE via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP, as described above, for example, with reference to FIGS. 9, 10A, 10B, 11A, 11B, and/or 12.

Process 1400 may include additional aspects, such as any single aspect or any combination of aspects described below and/or in connection with one or more other processes described elsewhere herein.

In a first aspect, the explicit multi-TRP information includes a bitmap that identifies a plurality of cells.

In a second aspect, alone or in combination with the first aspect, the bitmap includes a plurality of bits that respectively correspond to the plurality of cells, wherein a first state of a bit of the plurality of bits indicates that a corresponding cell is activated and a second state of the bit indicates that the corresponding cell is deactivated.

In a third aspect, alone or in combination with one or more of the first and second aspects, the explicit multi-TRP information comprises a cell identifier portion that includes a plurality of cell identifiers, wherein one or more cell identifiers of the plurality of cell identifiers respectively indicate one or more activated cells, a TRS portion that includes one or more TRS identifiers, wherein each TRS identifier of the one or more TRS identifiers is associated with an activated cell of the one or more activated cells, and a primary cell information portion that includes information associated with the primary cell.

In a fourth aspect, alone or in combination with one or more of the first through third aspects, the explicit multi-TRP information further comprises a special cell configuration identifier based at least in part on a special cell associated with the special cell configuration identifier having been previously deactivated.

In a fifth aspect, alone or in combination with one or more of the first through fourth aspects, the cell identifier portion comprises a bitmap that includes a plurality of bits that respectively correspond to the plurality of cell identifiers, and the primary cell information portion includes one or more bits that indicate a cell identifier associated with the primary cell and one or more other bits that indicate a TRP index associated with the primary TRP.

In a sixth aspect, alone or in combination with one or more of the first through fifth aspects, the explicit multi-TRP information is associated with a plurality of octets, wherein the cell identifier portion is included in four octets of the plurality of octets, the TRS portion is included in a number of octets of the plurality of octets that corresponds to a number of cells associated with the one or more activated cells, and the primary cell information portion is included in a single octet.

In a seventh aspect, alone or in combination with one or more of the first through sixth aspects, the explicit multi-TRP information further comprises a TRP bitmap portion that indicates a set of TRPs, from the plurality of TRPs, associated with the primary cell, wherein the set of TRPs includes the primary TRP.

In an eighth aspect, alone or in combination with one or more of the first through seventh aspects, the TRP bitmap portion includes a plurality of TRP bits that respectively correspond to the plurality of TRPs, wherein a first state of a TRP bit of the plurality of TRP bits indicates that a corresponding TRP is activated and a second state of the TRP bit indicates that the corresponding TRP is deactivated.

In a ninth aspect, alone or in combination with one or more of the first through eighth aspects, the explicit multi-TRP information comprises a joint bitmap portion that includes joint bitmap information associated with a plurality of cell-TRP combinations, a TRS portion that includes one or more TRS identifiers, wherein each TRS identifier of the one or more TRS identifiers is associated with an activated cell of one or more activated cells, and a primary cell information portion that includes information associated with the primary cell.

In a tenth aspect, alone or in combination with one or more of the first through ninth aspects, the joint bitmap information includes a plurality of joint bitmap bits that respectively correspond to the plurality of cell-TRP combinations, wherein a first state of a joint bitmap bit of the plurality of joint bitmap bits indicates that a corresponding cell-TRP combination is activated, and a second state of the joint bitmap bit indicates that the corresponding cell-TRP combination is deactivated.

In an eleventh aspect, alone or in combination with one or more of the first through tenth aspects, the explicit multi-TRP information further comprises a special cell configuration identifier based at least in part on a special cell associated with the special cell configuration identifier having been previously deactivated.

In a twelfth aspect, alone or in combination with one or more of the first through eleventh aspects, the primary cell information portion includes one or more bits that indicate a cell identifier associated with the primary cell and one or more other bits that indicate a TRP index associated with the primary TRP.

In a thirteenth aspect, alone or in combination with one or more of the first through twelfth aspects, the explicit multi-TRP information is associated with a plurality of octets, wherein the joint bitmap portion is included in thirty-two octets of the plurality of octets, the TRS portion is included in a number of octets of the plurality of octets that corresponds to a number of cells associated with the one or more activated cells, and the primary cell information portion is included in a single octet.

In a fourteenth aspect, alone or in combination with one or more of the first through thirteenth aspects, the joint bitmap information includes coding information associated with the plurality of cell-TRP combinations.

In a fifteenth aspect, alone or in combination with one or more of the first through fourteenth aspects, the explicit multi-TRP information is associated with a plurality of octets, wherein the joint bitmap portion is included in five octets of the plurality of octets, the TRS portion is included in a number of octets of the plurality of octets that corresponds to a number of cells associated with the one or more activated cells, and the primary cell information portion is included in a single octet.

In a sixteenth aspect, alone or in combination with one or more of the first through fifteenth aspects, the explicit multi-TRP information comprises a TRP bitmap portion that includes a plurality of TRP bits that respectively correspond to the plurality of TRPs, wherein a first state of a TRP bit of the plurality of TRP bits indicates that a corresponding TRP is activated and a second state of the TRP bit indicates that the corresponding TRP is deactivated, a cell column portion that includes cell column combination information associated with one or more activated cells, a cell row portion that includes cell row combination information associated with the one or more activated cells, a TRS portion that includes one or more TRS identifiers, wherein each TRS identifier of the one or more TRS identifiers is associated with an activated cell of the one or more activated cells, and a primary cell information portion that includes information associated with the primary cell.

In a seventeenth aspect, alone or in combination with one or more of the first through sixteenth aspects, the explicit multi-TRP information further comprises coding information associated with the cell column combination information and the cell row combination information.

In an eighteenth aspect, alone or in combination with one or more of the first through seventeenth aspects, the explicit multi-TRP information further comprises a special cell configuration identifier based at least in part on a special cell associated with the special cell configuration identifier having been previously deactivated.

In a nineteenth aspect, alone or in combination with one or more of the first through eighteenth aspects, the primary cell information portion includes one or more bits that indicate a cell identifier associated with the primary cell and one or more other bits that indicate a TRP index associated with the primary TRP.

In a twentieth aspect, alone or in combination with one or more of the first through nineteenth aspects, the explicit multi-TRP information is associated with a plurality of octets, wherein the TRP bitmap portion is included in a single octet, the cell column portion is included in a number of octets of the plurality of octets that corresponds to a number of cells associated with the one or more activated cells, the cell row portion is included in a number of octets of the plurality of octets that corresponds to half of the number of cells associated with the one or more activated cells, the TRS portion is included in a number of octets of the plurality of octets that corresponds to the number of cells associated with the one or more activated cells, and the primary cell information portion is included in another single octet.

In a twenty-first aspect, alone or in combination with one or more of the first through twentieth aspects, the explicit multi-TRP information further comprises a transmission configuration indicator state identifier.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
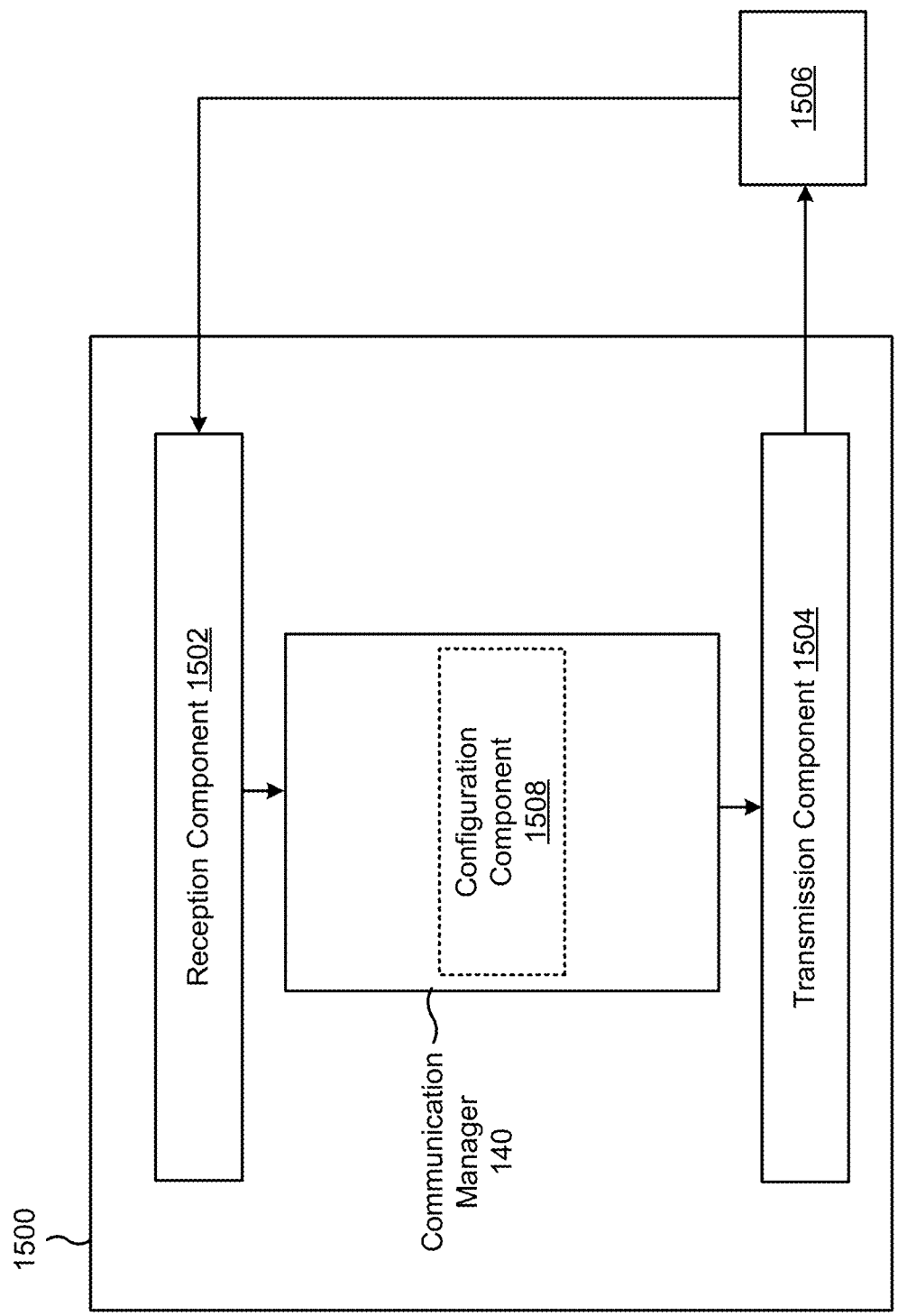
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 140. The communication manager 140 may include a configuration component 1508, among other examples.

In some aspects, the apparatus 1500 may be configured to perform one or more operations described herein in connection with FIG. 9-12. Additionally, or alternatively, the apparatus 1500 may be configured to perform one or more processes described herein, such as process 1300 of FIG. 13. In some aspects, the apparatus 1500 and/or one or more components shown in FIG. 15 may include one or more components of the UE described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the UE described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the UE described in connection with FIG. 2. In some aspects, the transmission component 1504 may be co-located with the reception component 1502 in a transceiver.

The reception component 1502 may receive, from a first serving cell via Layer 3 control signaling, a configuration indicating a plurality of TRPs and one or more parameters enabling activation or deactivation of TRPs in the plurality of TRPs. The reception component 1502 may receive, from the first serving cell via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP. The reception component 1502 and/or the transmission component 1504 may communicate with the primary cell and the primary TRP based at least in part on the explicit multi-TRP information and the one or more parameters. The configuration component 1508 may be configured to receive configuration information for communicating the multi-TRP information.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
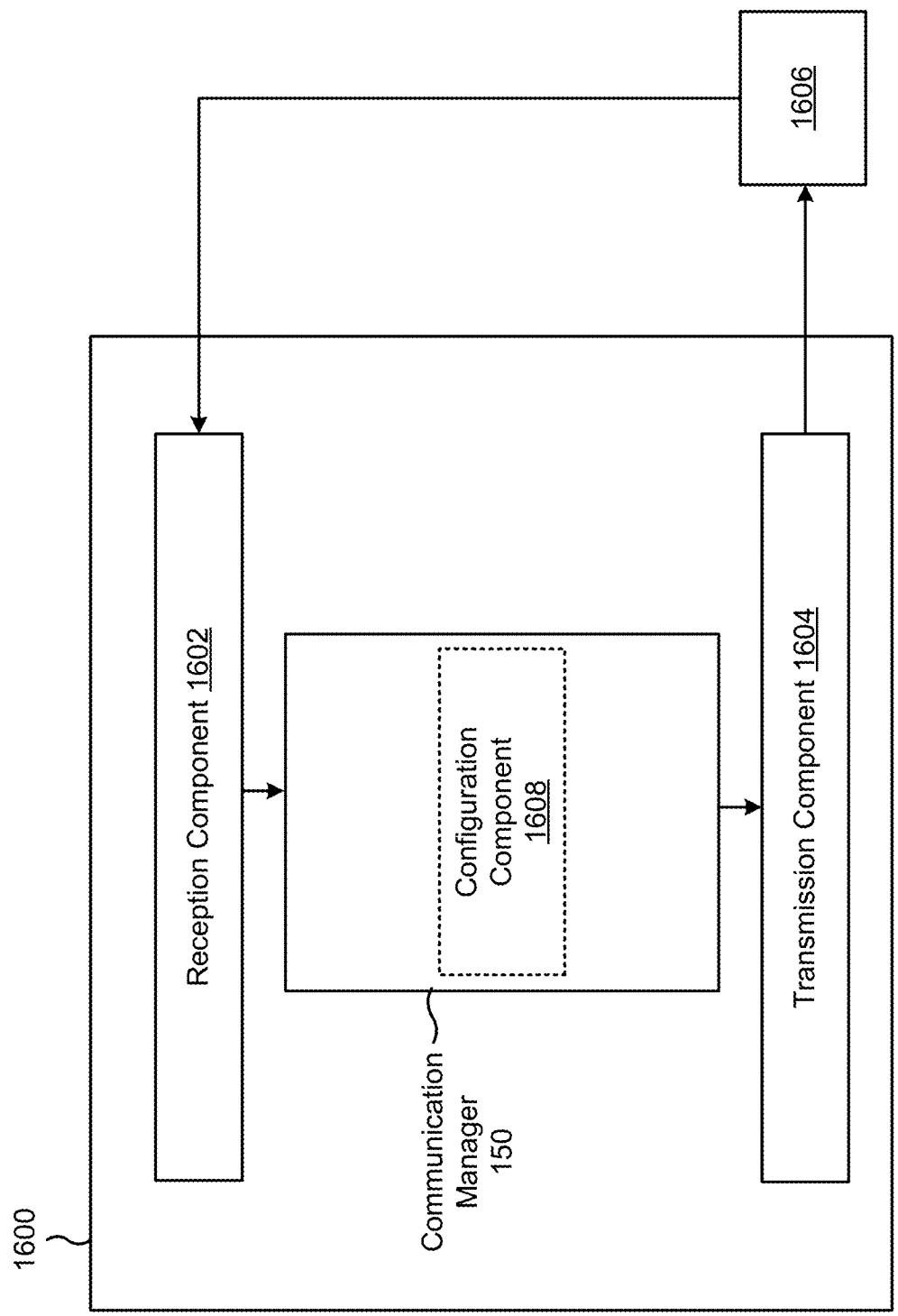
FIG. 16 is a diagram of an example apparatus for wireless communication, in accordance with the present disclosure.

FIG. 16 is a diagram of an example apparatus 1600 for wireless communication, in accordance with the present disclosure. The apparatus 1600 may be a network node, or a network node may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include the communication manager 150. The communication manager 150 may include a configuration component 1608, among other examples.

In some aspects, the apparatus 1600 may be configured to perform one or more operations described herein in connection with FIG. 9-12. Additionally, or alternatively, the apparatus 1600 may be configured to perform one or more processes described herein, such as process 1400 of FIG. 14. In some aspects, the apparatus 1600 and/or one or more components shown in FIG. 16 may include one or more components of the network node described in connection with FIG. 2. Additionally, or alternatively, one or more components shown in FIG. 16 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1600. In some aspects, the reception component 1602 may include one or more antennas, a modem, a demodulator, a MIMO detector, a receive processor, a controller/processor, a memory, or a combination thereof, of the network node described in connection with FIG. 2.

The transmission component 1604 may transmit communications, such as reference signals, control information, data communications, or a combination thereof, to the apparatus 1606. In some aspects, one or more other components of the apparatus 1600 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modem, a modulator, a transmit MIMO processor, a transmit processor, a controller/processor, a memory, or a combination thereof, of the network node described in connection with FIG. 2. In some aspects, the transmission component 1604 may be co-located with the reception component 1602 in a transceiver.

The transmission component 1604 may transmit, to a UE via Layer 3 control signaling, a configuration indicating a plurality of TRPs and one or more parameters enabling activation or deactivation of TRPs in the plurality of TRPs. The transmission component 1604 may transmit, to the UE via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP. The configuration component 1608 may be configured to transmit configuration information for communicating the multi-TRP information.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The following provides an overview of some Aspects of the present disclosure:

Aspect 1: A method of wireless communication performed by a user equipment (UE), comprising: receiving, from a first serving cell via Layer 3 control signaling, a configuration indicating a plurality of transmission reception points (TRPs) and one or more parameters enabling activation or deactivation of TRPs in the plurality of TRPs; receiving, from the first serving cell via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP; and communicating with the primary cell and the primary TRP based at least in part on the explicit multi-TRP information and the one or more parameters.

Aspect 2: The method of Aspect 1, wherein the explicit multi-TRP information includes a bitmap that identifies a plurality of cells.

Aspect 3: The method of Aspect 2, wherein the bitmap includes a plurality of bits that respectively correspond to the plurality of cells, wherein a first state of a bit of the plurality of bits indicates that a corresponding cell is activated and a second state of the bit indicates that the corresponding cell is deactivated.

Aspect 4: The method of any of Aspects 1-3, wherein the explicit multi-TRP information comprises: a cell identifier portion that includes a plurality of cell identifiers, wherein one or more cell identifiers of the plurality of cell identifiers respectively indicate one or more activated cells; a tracking reference signal (TRS) portion that includes one or more TRS identifiers, wherein each TRS identifier of the one or more TRS identifiers is associated with an activated cell of the one or more activated cells; and a primary cell information portion that includes information associated with the primary cell.

Aspect 5: The method of Aspect 4, wherein the explicit multi-TRP information further comprises a special cell configuration identifier based at least in part on a special cell associated with the special cell configuration identifier having been previously deactivated.

Aspect 6: The method of Aspect 4, wherein the cell identifier portion comprises a bitmap that includes a plurality of bits that respectively correspond to the plurality of cell identifiers, and the primary cell information portion includes one or more bits that indicate a cell identifier associated with the primary cell and one or more other bits that indicate a TRP index associated with the primary TRP.

Aspect 7: The method of Aspect 4, wherein the explicit multi-TRP information is associated with a plurality of octets, wherein the cell identifier portion is included in four octets of the plurality of octets, the TRS portion is included in a number of octets of the plurality of octets that corresponds to a number of cells associated with the one or more activated cells, and the primary cell information portion is included in a single octet.

Aspect 8: The method of Aspect 4, wherein the explicit multi-TRP information further comprises a TRP bitmap portion that indicates a set of TRPs, from the plurality of TRPs, associated with the primary cell, wherein the set of TRPs includes the primary TRP.

Aspect 9: The method of Aspect 8, wherein the TRP bitmap portion includes a plurality of TRP bits that respectively correspond to the plurality of TRPs, wherein a first state of a TRP bit of the plurality of TRP bits indicates that a corresponding TRP is activated and a second state of the TRP bit indicates that the corresponding TRP is deactivated.

Aspect 10: The method of any of Aspects 1-9, wherein the explicit multi-TRP information comprises: a joint bitmap portion that includes joint bitmap information associated with a plurality of cell-TRP combinations; a tracking reference signal (TRS) portion that includes one or more TRS identifiers, wherein each TRS identifier of the one or more TRS identifiers is associated with an activated cell of one or more activated cells; and a primary cell information portion that includes information associated with the primary cell.

Aspect 11: The method of Aspect 10, wherein the joint bitmap information includes a plurality of joint bitmap bits that respectively correspond to the plurality of cell-TRP combinations, wherein a first state of a joint bitmap bit of the plurality of joint bitmap bits indicates that a corresponding cell-TRP combination is activated, and a second state of the joint bitmap bit indicates that the corresponding cell-TRP combination is deactivated.

Aspect 12: The method of Aspect 10, wherein the explicit multi-TRP information further comprises a special cell configuration identifier based at least in part on a special cell associated with the special cell configuration identifier having been previously deactivated.

Aspect 13: The method of Aspect 10, wherein the primary cell information portion includes one or more bits that indicate a cell identifier associated with the primary cell and one or more other bits that indicate a TRP index associated with the primary TRP.

Aspect 14: The method of Aspect 10, wherein the explicit multi-TRP information is associated with a plurality of octets, wherein the joint bitmap portion is included in thirty-two octets of the plurality of octets, the TRS portion is included in a number of octets of the plurality of octets that corresponds to a number of cells associated with the one or more activated cells, and the primary cell information portion is included in a single octet.

Aspect 15: The method of Aspect 10, wherein the joint bitmap information includes coding information associated with the plurality of cell-TRP combinations.

Aspect 16: The method of Aspect 15, wherein the explicit multi-TRP information is associated with a plurality of octets, wherein the joint bitmap portion is included in five octets of the plurality of octets, the TRS portion is included in a number of octets of the plurality of octets that corresponds to a number of cells associated with the one or more activated cells, and the primary cell information portion is included in a single octet.

Aspect 17: The method of any of Aspects 1-6, wherein the explicit multi-TRP information comprises: a TRP bitmap portion that includes a plurality of TRP bits that respectively correspond to the plurality of TRPs, wherein a first state of a TRP bit of the plurality of TRP bits indicates that a corresponding TRP is activated and a second state of the TRP bit indicates that the corresponding TRP is deactivated; a cell column portion that includes cell column combination information associated with one or more activated cells; a cell row portion that includes cell row combination information associated with the one or more activated cells; a tracking reference signal (TRS) portion that includes one or more TRS identifiers, wherein each TRS identifier of the one or more TRS identifiers is associated with an activated cell of the one or more activated cells; and a primary cell information portion that includes information associated with the primary cell.

Aspect 18: The method of Aspect 17, wherein the explicit multi-TRP information further comprises coding information associated with the cell column combination information and the cell row combination information.

Aspect 19: The method of Aspect 17, wherein the explicit multi-TRP information further comprises a special cell configuration identifier based at least in part on a special cell associated with the special cell configuration identifier having been previously deactivated.

Aspect 20: The method of Aspect 17, wherein the primary cell information portion includes one or more bits that indicate a cell identifier associated with the primary cell and one or more other bits that indicate a TRP index associated with the primary TRP.

Aspect 21: The method of Aspect 17, wherein the explicit multi-TRP information is associated with a plurality of octets, wherein the TRP bitmap portion is included in a single octet, the cell column portion is included in a number of octets of the plurality of octets that corresponds to a number of cells associated with the one or more activated cells, the cell row portion is included in a number of octets of the plurality of octets that corresponds to half of the number of cells associated with the one or more activated cells, the TRS portion is included in a number of octets of the plurality of octets that corresponds to the number of cells associated with the one or more activated cells, and the primary cell information portion is included in another single octet.

Aspect 22: The method of any of Aspects 1-21, wherein the explicit multi-TRP information further comprises a transmission configuration indicator state identifier.

Aspect 23: A method of wireless communication performed by a network node, comprising: transmitting, to a user equipment (UE) via Layer 3 control signaling, a configuration indicating a plurality of transmission reception points (TRPs) and one or more parameters enabling activation or deactivation of TRPs in the plurality of TRPs; and transmitting, to the UE via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP.

Aspect 24: The method of Aspect 23, wherein the explicit multi-TRP information includes a bitmap that identifies a plurality of cells.

Aspect 25: The method of Aspect 24, wherein the bitmap includes a plurality of bits that respectively correspond to the plurality of cells, wherein a first state of a bit of the plurality of bits indicates that a corresponding cell is activated and a second state of the bit indicates that the corresponding cell is deactivated.

Aspect 26: The method of any of Aspects 23-25, wherein the explicit multi-TRP information comprises: a cell identifier portion that includes a plurality of cell identifiers, wherein one or more cell identifiers of the plurality of cell identifiers respectively indicate one or more activated cells; a tracking reference signal (TRS) portion that includes one or more TRS identifiers, wherein each TRS identifier of the one or more TRS identifiers is associated with an activated cell of the one or more activated cells; and a primary cell information portion that includes information associated with the primary cell.

Aspect 27: The method of Aspect 26, wherein the explicit multi-TRP information further comprises a special cell configuration identifier based at least in part on a special cell associated with the special cell configuration identifier having been previously deactivated.

Aspect 28: The method of Aspect 26, wherein the cell identifier portion comprises a bitmap that includes a plurality of bits that respectively correspond to the plurality of cell identifiers, and the primary cell information portion includes one or more bits that indicate a cell identifier associated with the primary cell and one or more other bits that indicate a TRP index associated with the primary TRP.

Aspect 29: The method of Aspect 26, wherein the explicit multi-TRP information is associated with a plurality of octets, wherein the cell identifier portion is included in four octets of the plurality of octets, the TRS portion is included in a number of octets of the plurality of octets that corresponds to a number of cells associated with the one or more activated cells, and the primary cell information portion is included in a single octet.

Aspect 30: The method of Aspect 26, wherein the explicit multi-TRP information further comprises a TRP bitmap portion that indicates a set of TRPs, from the plurality of TRPs, associated with the primary cell, wherein the set of TRPs includes the primary TRP.

Aspect 31: The method of Aspect 30, wherein the TRP bitmap portion includes a plurality of TRP bits that respectively correspond to the plurality of TRPs, wherein a first state of a TRP bit of the plurality of TRP bits indicates that a corresponding TRP is activated and a second state of the TRP bit indicates that the corresponding TRP is deactivated.

Aspect 32: The method of any of Aspects 23-31, wherein the explicit multi-TRP information comprises: a joint bitmap portion that includes joint bitmap information associated with a plurality of cell-TRP combinations; a tracking reference signal (TRS) portion that includes one or more TRS identifiers, wherein each TRS identifier of the one or more TRS identifiers is associated with an activated cell of one or more activated cells; and a primary cell information portion that includes information associated with the primary cell.

Aspect 33: The method of Aspect 32, wherein the joint bitmap information includes a plurality of joint bitmap bits that respectively correspond to the plurality of cell-TRP combinations, wherein a first state of a joint bitmap bit of the plurality of joint bitmap bits indicates that a corresponding cell-TRP combination is activated, and a second state of the joint bitmap bit indicates that the corresponding cell-TRP combination is deactivated.

Aspect 34: The method of Aspect 32, wherein the explicit multi-TRP information further comprises a special cell configuration identifier based at least in part on a special cell associated with the special cell configuration identifier having been previously deactivated.

Aspect 35: The method of Aspect 32, wherein the primary cell information portion includes one or more bits that indicate a cell identifier associated with the primary cell and one or more other bits that indicate a TRP index associated with the primary TRP.

Aspect 36: The method of Aspect 32, wherein the explicit multi-TRP information is associated with a plurality of octets, wherein the joint bitmap portion is included in thirty-two octets of the plurality of octets, the TRS portion is included in a number of octets of the plurality of octets that corresponds to a number of cells associated with the one or more activated cells, and the primary cell information portion is included in a single octet.

Aspect 37: The method of Aspect 32, wherein the joint bitmap information includes coding information associated with the plurality of cell-TRP combinations.

Aspect 38: The method of Aspect 37, wherein the explicit multi-TRP information is associated with a plurality of octets, wherein the joint bitmap portion is included in five octets of the plurality of octets, the TRS portion is included in a number of octets of the plurality of octets that corresponds to a number of cells associated with the one or more activated cells, and the primary cell information portion is included in a single octet.

Aspect 39: The method of any of Aspects 23-37, wherein the explicit multi-TRP information comprises: a TRP bitmap portion that includes a plurality of TRP bits that respectively correspond to the plurality of TRPs, wherein a first state of a TRP bit of the plurality of TRP bits indicates that a corresponding TRP is activated and a second state of the TRP bit indicates that the corresponding TRP is deactivated;

a cell column portion that includes cell column combination information associated with one or more activated cells; a cell row portion that includes cell row combination information associated with the one or more activated cells; a tracking reference signal (TRS) portion that includes one or more TRS identifiers, wherein each TRS identifier of the one or more TRS identifiers is associated with an activated cell of the one or more activated cells; and a primary cell information portion that includes information associated with the primary cell.

Aspect 40: The method of Aspect 39, wherein the explicit multi-TRP information further comprises coding information associated with the cell column combination information and the cell row combination information.

Aspect 41: The method of Aspect 39, wherein the explicit multi-TRP information further comprises a special cell configuration identifier based at least in part on a special cell associated with the special cell configuration identifier having been previously deactivated.

Aspect 42: The method of Aspect 39, wherein the primary cell information portion includes one or more bits that indicate a cell identifier associated with the primary cell and one or more other bits that indicate a TRP index associated with the primary TRP.

Aspect 43: The method of Aspect 39, wherein the explicit multi-TRP information is associated with a plurality of octets, wherein the TRP bitmap portion is included in a single octet, the cell column portion is included in a number of octets of the plurality of octets that corresponds to a number of cells associated with the one or more activated cells, the cell row portion is included in a number of octets of the plurality of octets that corresponds to half of the number of cells associated with the one or more activated cells, the TRS portion is included in a number of octets of the plurality of octets that corresponds to the number of cells associated with the one or more activated cells, and the primary cell information portion is included in another single octet.

Aspect 44: The method of any of Aspects 23-43, wherein the explicit multi-TRP information further comprises a transmission configuration indicator state identifier.

Aspect 45: An apparatus for wireless communication at a device, comprising a processor; memory coupled with the processor; and instructions stored in the memory and executable by the processor to cause the apparatus to perform the method of one or more of Aspects 1-22.

Aspect 46: A device for wireless communication, comprising a memory and one or more processors coupled to the memory, the one or more processors configured to perform the method of one or more of Aspects 1-22.

Aspect 47: An apparatus for wireless communication, comprising at least one means for performing the method of one or more of Aspects 1-22.

Aspect 48: A non-transitory computer-readable medium storing code for wireless communication, the code comprising instructions executable by a processor to perform the method of one or more of Aspects 1-22.

Aspect 49: A non-transitory computer-readable medium storing a set of instructions for wireless communication, the set of instructions comprising one or more instructions that, when executed by one or more processors of a device, cause the device to perform the method of one or more of Aspects 1-22.

Aspect 50: An apparatus for wireless communication at a device, comprising a processor; memory coupled with the processor; and instructions stored in the memory and executable by the processor to cause the apparatus to perform the method of one or more of Aspects 23-44.

Aspect 51: A device for wireless communication, comprising a memory and one or more processors coupled to the memory, the one or more processors configured to perform the method of one or more of Aspects 23-44.

Aspect 52: An apparatus for wireless communication, comprising at least one means for performing the method of one or more of Aspects 23-44.

Aspect 53: A non-transitory computer-readable medium storing code for wireless communication, the code comprising instructions executable by a processor to perform the method of one or more of Aspects 23-44.

Aspect 54: A non-transitory computer-readable medium storing a set of instructions for wireless communication, the set of instructions comprising one or more instructions that, when executed by one or more processors of a device, cause the device to perform the method of one or more of Aspects 23-44.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
a memory; and
one or more processors, coupled to the memory, configured to:
receive, from a first serving cell via Layer 3 control signaling, a configuration indicating a plurality of transmission reception points (TRPs) and one or more parameters enabling activation or deactivation of TRPs in the plurality of TRPs;
receive, from the first serving cell via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP, wherein the explicit multi-TRP information comprises a primary cell information portion that comprises one or more bits that indicate a cell identifier associated with the primary cell and one or more other bits that indicate a TRP index associated with the primary TRP; and
communicate with the primary cell and the primary TRP based at least in part on the explicit multi-TRP information and the one or more parameters.

2. The apparatus of claim 1, wherein the explicit multi-TRP information includes a bitmap that includes a plurality of bits that respectively correspond to a plurality of cells, wherein a first state of a bit of the plurality of bits indicates that a corresponding cell is activated and a second state of the bit indicates that the corresponding cell is deactivated.

3. The apparatus of claim 1, wherein the explicit multi-TRP information comprises:
a cell identifier portion that includes a plurality of cell identifiers, wherein one or more cell identifiers of the plurality of cell identifiers respectively indicate one or more activated cells; or
a tracking reference signal (TRS) portion that includes one or more TRS identifiers, wherein each TRS identifier of the one or more TRS identifiers is associated with an activated cell of the one or more activated cells.

4. The apparatus of claim 3, wherein the explicit multi-TRP information further comprises a special cell configuration identifier based at least in part on a special cell associated with the special cell configuration identifier having been previously deactivated.

5. The apparatus of claim 3, wherein the cell identifier portion comprises a bitmap that includes a plurality of bits that respectively correspond to the plurality of cell identifiers.

6. The apparatus of claim 3, wherein the explicit multi-TRP information further comprises a TRP bitmap portion that indicates a set of TRPs, from the plurality of TRPs, associated with the primary cell, wherein the set of TRPs includes the primary TRP.

7. The apparatus of claim 1, wherein the explicit multi-TRP information comprises:
a joint bitmap portion that includes joint bitmap information associated with a plurality of cell-TRP combinations;
a tracking reference signal (TRS) portion that includes one or more TRS identifiers, wherein each TRS identifier of the one or more TRS identifiers is associated with an activated cell of one or more activated cells; and
the primary cell information portion.

8. The apparatus of claim 7, wherein the joint bitmap information includes a plurality of joint bitmap bits that respectively correspond to the plurality of cell-TRP combinations, wherein a first state of a joint bitmap bit of the plurality of joint bitmap bits indicates that a corresponding cell-TRP combination is activated, and a second state of the joint bitmap bit indicates that the corresponding cell-TRP combination is deactivated.

9. The apparatus of claim 7, wherein the explicit multi-TRP information further comprises a special cell configuration identifier based at least in part on a special cell associated with the special cell configuration identifier having been previously deactivated.

10. The apparatus of claim 7, wherein the joint bitmap information includes coding information associated with the plurality of cell-TRP combinations.

11. The apparatus of claim 1, wherein the explicit multi-TRP information comprises:
a TRP bitmap portion that includes a plurality of TRP bits that respectively correspond to the plurality of TRPs, wherein a first state of a TRP bit of the plurality of TRP bits indicates that a corresponding TRP is activated and a second state of the TRP bit indicates that the corresponding TRP is deactivated;
a cell column portion that includes cell column combination information associated with one or more activated cells;
a cell row portion that includes cell row combination information associated with the one or more activated cells;
a tracking reference signal (TRS) portion that includes one or more TRS identifiers, wherein each TRS identifier of the one or more TRS identifiers is associated with an activated cell of the one or more activated cells; and
the primary cell information portion.

12. The apparatus of claim 11, wherein the explicit multi-TRP information further comprises coding information associated with the cell column combination information and the cell row combination information.

13. The apparatus of claim 11, wherein the explicit multi-TRP information further comprises a special cell configuration identifier based at least in part on a special cell associated with the special cell configuration identifier having been previously deactivated.

14. The apparatus of claim 1, wherein the explicit multi-TRP information further comprises a transmission configuration indicator state identifier.

15. An apparatus for wireless communication at a network node, comprising:
a memory; and
one or more processors, coupled to the memory, configured to:
transmit, to a user equipment (UE) via Layer 3 control signaling, a configuration indicating a plurality of transmission reception points (TRPs) and one or more parameters enabling activation or deactivation of TRPs in the plurality of TRPs; and
transmit, to the UE via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP, wherein the explicit multi-TRP information comprises a primary cell information portion that comprises one or more bits that indicate a cell identifier associated with the primary cell and one or more other bits that indicate a TRP index associated with the primary TRP.

16. The apparatus of claim 15, wherein the explicit multi-TRP information includes a bitmap that includes a plurality of bits that respectively correspond to a plurality of cells, wherein a first state of a bit of the plurality of bits indicates that a corresponding cell is activated and a second state of the bit indicates that the corresponding cell is deactivated.

17. The apparatus of claim 15, wherein the explicit multi-TRP information comprises:
a cell identifier portion that includes a plurality of cell identifiers, wherein one or more cell identifiers of the plurality of cell identifiers respectively indicate one or more activated cells; or
a tracking reference signal (TRS) portion that includes one or more TRS identifiers, wherein each TRS identifier of the one or more TRS identifiers is associated with an activated cell of the one or more activated cells.

18. The apparatus of claim 17, wherein the cell identifier portion comprises a bitmap that includes a plurality of bits that respectively correspond to the plurality of cell identifiers.

19. The apparatus of claim 17, wherein the explicit multi-TRP information further comprises a TRP bitmap portion that indicates a set of TRPs, from the plurality of TRPs, associated with the primary cell, wherein the set of TRPs includes the primary TRP.

20. The apparatus of claim 15, wherein the explicit multi-TRP information comprises:
a joint bitmap portion that includes joint bitmap information associated with a plurality of cell-TRP combinations;
a tracking reference signal (TRS) portion that includes one or more TRS identifiers, wherein each TRS identifier of the one or more TRS identifiers is associated with an activated cell of one or more activated cells; and
the primary cell information portion.

21. The apparatus of claim 20, wherein the joint bitmap information includes a plurality of joint bitmap bits that respectively correspond to the plurality of cell-TRP combinations, wherein a first state of a joint bitmap bit of the plurality of joint bitmap bits indicates that a corresponding cell-TRP combination is activated, and a second state of the joint bitmap bit indicates that the corresponding cell-TRP combination is deactivated.

22. The apparatus of claim 20, wherein the joint bitmap information includes coding information associated with the plurality of cell-TRP combinations.

23. The apparatus of claim 15, wherein the explicit multi-TRP information comprises:
a TRP bitmap portion that includes a plurality of TRP bits that respectively correspond to the plurality of TRPs, wherein a first state of a TRP bit of the plurality of TRP bits indicates that a corresponding TRP is activated and a second state of the TRP bit indicates that the corresponding TRP is deactivated;
a cell column portion that includes cell column combination information associated with one or more activated cells;
a cell row portion that includes cell row combination information associated with the one or more activated cells;
a tracking reference signal (TRS) portion that includes one or more TRS identifiers, wherein each TRS identifier of the one or more TRS identifiers is associated with an activated cell of the one or more activated cells; and
the primary cell information portion.

24. The apparatus of claim 23, wherein the explicit multi-TRP information further comprises coding information associated with the cell column combination information and the cell row combination information.

25. A method of wireless communication performed by a user equipment (UE), comprising:
receiving, from a first serving cell via Layer 3 control signaling, a configuration indicating a plurality of transmission reception points (TRPs) and one or more parameters enabling activation or deactivation of TRPs in the plurality of TRPs;
receiving, from the first serving cell via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP, wherein the explicit multi-TRP information comprises a primary cell information portion that comprises one or more bits that indicate a cell identifer associated with the primary cell and one or more other bits that indicate a TRP index associated with the primary TRP; and
communicating with the primary cell and the primary TRP based at least in part on the explicit multi-TRP information and the one or more parameters.

26. The method of claim 25, wherein the explicit multi-TRP information comprises:
a cell identifier portion that includes a plurality of cell identifiers, wherein one or more cell identifiers of the plurality of cell identifiers respectively indicate one or more activated cells; or
a tracking reference signal (TRS) portion that includes one or more TRS identifiers, wherein each TRS identifier of the one or more TRS identifiers is associated with an activated cell of the one or more activated cells.

27. A method of wireless communication performed by a network node, comprising:
- transmitting, to a user equipment (UE) via Layer 3 control signaling, a configuration indicating a plurality of transmission reception points (TRPs) and one or more parameters enabling activation or deactivation of TRPs in the plurality of TRPs; and
- transmitting, to the UE via Layer 2 control signaling, explicit multi-TRP information that indicates an activation of a second serving cell and a TRP, from the plurality of TRPs, associated with the second serving cell, wherein the explicit multi-TRP information indicates that the second serving cell is to be activated as a primary cell and the TRP associated with the second serving cell is to be activated as a primary TRP, wherein the explicit multi-TRP information comprises a primary cell information portion that comprises one or more bits that indicate a cell identifier associated with the primary cell and one or more other bits that indicate a TRP index associated with the primary TRP.

28. The method of claim 27, wherein the explicit multi-TRP information comprises:
- a cell identifier portion that includes a plurality of cell identifiers, wherein one or more cell identifiers of the plurality of cell identifiers respectively indicate one or more activated cells; or
- a tracking reference signal (TRS) portion that includes one or more TRS identifiers, wherein each TRS identifier of the one or more TRS identifiers is associated with an activated cell of the one or more activated cells.

29. The method of claim 25, wherein the explicit multi-TRP information includes a bitmap that includes a plurality of bits that respectively correspond to a plurality of cells, wherein a first state of a bit of the plurality of bits indicates that a corresponding cell is activated and a second state of the bit indicates that the corresponding cell is deactivated.

30. The method of claim 25, wherein the explicit multi-TRP information further comprises a special cell configuration identifier based at least in part on a special cell associated with the special cell configuration identifier having been previously deactivated.

* * * * *